US011657117B2

(12) United States Patent
Bagchi et al.

(10) Patent No.: US 11,657,117 B2
(45) Date of Patent: May 23, 2023

(54) UNIVERSAL INTERFACE ADAPTER

(71) Applicant: International Business Machines Corporation, Armonk, NY (US)

(72) Inventors: Debajyoti Bagchi, Kolkata (IN); Shantanu Sinha, Kolkata (IN); Arijit Mukherjee, Balurghat (IN); Sandip Gajanan Andhale, Rockville, MD (US); Sugata Chakrabarty, Kolkata (IN); Sarthak Sahoo, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/193,799

(22) Filed: Mar. 5, 2021

(65) Prior Publication Data
US 2022/0284073 A1 Sep. 8, 2022

(51) Int. Cl.
G06F 16/9538 (2019.01)
G06F 16/958 (2019.01)
G06F 16/9532 (2019.01)
G06F 16/957 (2019.01)

(52) U.S. Cl.
CPC ........ *G06F 16/986* (2019.01); *G06F 16/9532* (2019.01); *G06F 16/9538* (2019.01); *G06F 16/9577* (2019.01)

(58) Field of Classification Search
CPC .............. G06F 16/986; G06F 16/9532; G06F 16/9577; G06F 16/9538
USPC ........................................................ 715/234
See application file for complete search history.

(56) References Cited

U.S. PATENT DOCUMENTS

| 8,156,246 | B2 | 4/2012 | Short |
| 9,369,748 | B2 | 6/2016 | Warrick |
| 9,456,047 | B2 | 9/2016 | Peng |
| 9,800,694 | B2 | 10/2017 | Peng |
| 10,664,556 | B2 * | 5/2020 | Lu ........................ G06F 40/106 |
| 10,951,486 | B2 * | 3/2021 | Masuda ............. G06F 3/04847 |
| 2012/0278494 | A1 | 11/2012 | Short |

(Continued)

OTHER PUBLICATIONS

"Hapi makes data integration simple," Hapi.com, May 17, 2019, 4 pages. <https://www.hapicloud.io/post/hapisimplification>.
"HTNG Releases New and Updated Interface Specifications," Hospitality Technology Next Generation, Sep. 30, 2009, 5 pages. <https://www.htng.org/news/358947/HTNG-Releases-New-and-Updated-Interface-Specifications.htm>.
"Oracle Hospitality Hotel Property Interface IFC8 XML_POS Specification," Oracle, Oct. 2020, 44 pages. <https://docs.oracle.com/cd/E94145_01/docs/HGBU-IFC8-XML_POS%20Interface%20Specs.pdf>.

(Continued)

Primary Examiner — William D Titcomb
(74) Attorney, Agent, or Firm — Richard B. Thomas

(57) ABSTRACT

A system, computer program product, and method are presented for integrating centralized systems with disparate devices and non-standardized communications protocols and message specifications. The method includes identifying one or more interface systems for one or more facilities. Each facility includes a centralized computing system. The method also includes capturing one or more interface specifications for the respective interface systems. The method further includes creating one or more JavaScript Object Notation (JSON) files from the interface specifications. Each JSON file includes one or more logical properties associated with the respective interface systems. The method also includes creating one or more JSON file combinations through stitching at least a portion of the one or more JSON files. The method further includes establishing cloud-based communications between the interface systems and the respective centralized system of the facilities through the JSON file combinations.

20 Claims, 16 Drawing Sheets

(56) References Cited

U.S. PATENT DOCUMENTS

| | | | |
|---|---|---|---|
| 2014/0229818 A1* | 8/2014 | Goswami | G06F 16/9577 715/234 |
| 2014/0310591 A1* | 10/2014 | Nguyen | G06F 40/143 715/234 |
| 2015/0020006 A1* | 1/2015 | Kotzer | G06F 16/9535 715/762 |
| 2016/0070813 A1* | 3/2016 | Unter Ecker | G06F 16/986 715/234 |
| 2017/0118037 A1 | 4/2017 | Kitchen | |
| 2017/0177172 A1* | 6/2017 | Graham | G06T 1/0007 |
| 2019/0188288 A1* | 6/2019 | Holm | G06F 16/211 |
| 2020/0133982 A1* | 4/2020 | Thangeswaran | G06F 16/9574 |
| 2020/0204458 A1* | 6/2020 | Masuda | G06F 16/9577 |
| 2020/0349164 A1* | 11/2020 | Eilebrecht | G06F 16/278 |
| 2021/0124799 A1* | 4/2021 | Gatter | G06F 40/12 |

OTHER PUBLICATIONS

"Oracle Hospitality OPERA IFC Controller and Hotel Property Interface (IFC8)," Oracle, Jul. 2020, 26 pages. <https://docs.oracle.com/cd/E94145_01/index.html>.

"Oracle Hospitality PMS Interface," Oracle, Nov. 2018, 125 pages. <https://docs.oracle.com/cd/E94145_01/docs/Oracle%20Hospitality-IFC8-FIAS%20Interface%20Specs%202.20.23.pdf>.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

UNIVERSAL INTERFACE ADAPTER

BACKGROUND

The present disclosure relates to universal communications interface adaptor applications, and, more specifically, to integrating centralized systems and services with disparate devices and their respective non-standardized communications protocols and message specifications.

Many known organizations and facilities include a myriad of centralized systems and services, typically arranged in hierarchical manner. In general, many of these known centralized systems and services include compatible communication protocols and message specifications, thereby defining a substantially integrated communications infrastructure. However, many of the known supporting systems within these known organizations and facilities include disparate devices and services that are required to communicate with the centralized systems. Moreover, the disparate devices and services include their respective non-standardized communications protocols and message specifications that rely on serial hardware configurations to facilitate the aforementioned communications. The serialized communications connections between the known supporting systems and the respective centralized systems and services rely on the associated serialized, physical, and wired hardware connections to an application server located on the premises.

SUMMARY

A system, computer program product, and method are provided for integrating communications between centralized systems and services with disparate devices and their respective non-standardized communications protocols and message specifications.

In one aspect, a computer system is provided for integrating communications between centralized systems and services with disparate devices and their respective non-standardized communications protocols and message specifications. The system includes one or more processing devices and at least one memory device operably coupled to the one or more processing devices. The one or more processing devices are configured to identify one or more interface systems for one or more facilities. Each facility of the one or more facilities includes a centralized computing system. The one or more processing devices are also configured to capture one or more interface specifications for the respective one or more interface systems. The one or more processing devices are further configured to create one or more JavaScript Object Notation (JSON) files from the one or more interface specifications. Each JSON file of the one or more JSON files includes one or more logical properties associated with the respective one or more interface systems. The one or more processing devices are also configured to create one or more JSON file combinations through stitching at least a portion of the one or more JSON files. The one or more processing devices are further configured to establish cloud-based communications between the one or more interface systems and the respective centralized system of the one or more facilities through the one or more JSON file combinations.

In another aspect, a computer program product is provided for integrating communications between centralized systems and services with disparate devices and their respective non-standardized communications protocols and message specifications. The computer program product includes one or more computer readable storage media, and program instructions collectively stored on the one or more computer storage media. The product also includes program instructions to identify one or more interface systems for one or more facilities. Each facility of the one or more facilities includes a centralized computing system. The product further includes program instructions to capture one or more interface specifications for the respective one or more interface systems. The product also includes program instructions to create one or more JavaScript Object Notation (JSON) files from the one or more interface specifications. Each JSON file of the one or more JSON files includes one or more logical properties associated with the respective one or more interface systems. The product further includes program instructions to create one or more JSON file combinations through stitching at least a portion of the one or more JSON files. The product also includes program instructions to establish cloud-based communications between the one or more interface systems and the respective centralized system of the one or more facilities through the one or more JSON file combinations.

In yet another aspect, a computer-implemented method is provided for integrating communication between centralized systems and services with disparate devices and their respective non-standardized communications protocols and message specifications. The method includes identifying one or more interface systems for one or more facilities. Each facility of the one or more facilities includes a centralized computing system. The method also includes capturing one or more interface specifications for the respective one or more interface systems. The method also includes creating one or more JavaScript Object Notation (JSON) files from the one or more interface specifications, wherein each JSON file of the one or more JSON files includes one or more logical properties associated with the respective one or more interface systems. The method further includes creating one or more JSON file combinations through stitching at least a portion of the one or more JSON files. The method also includes establishing cloud-based communications between the one or more interface systems and the respective centralized system of the one or more facilities through the one or more JSON file combinations.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
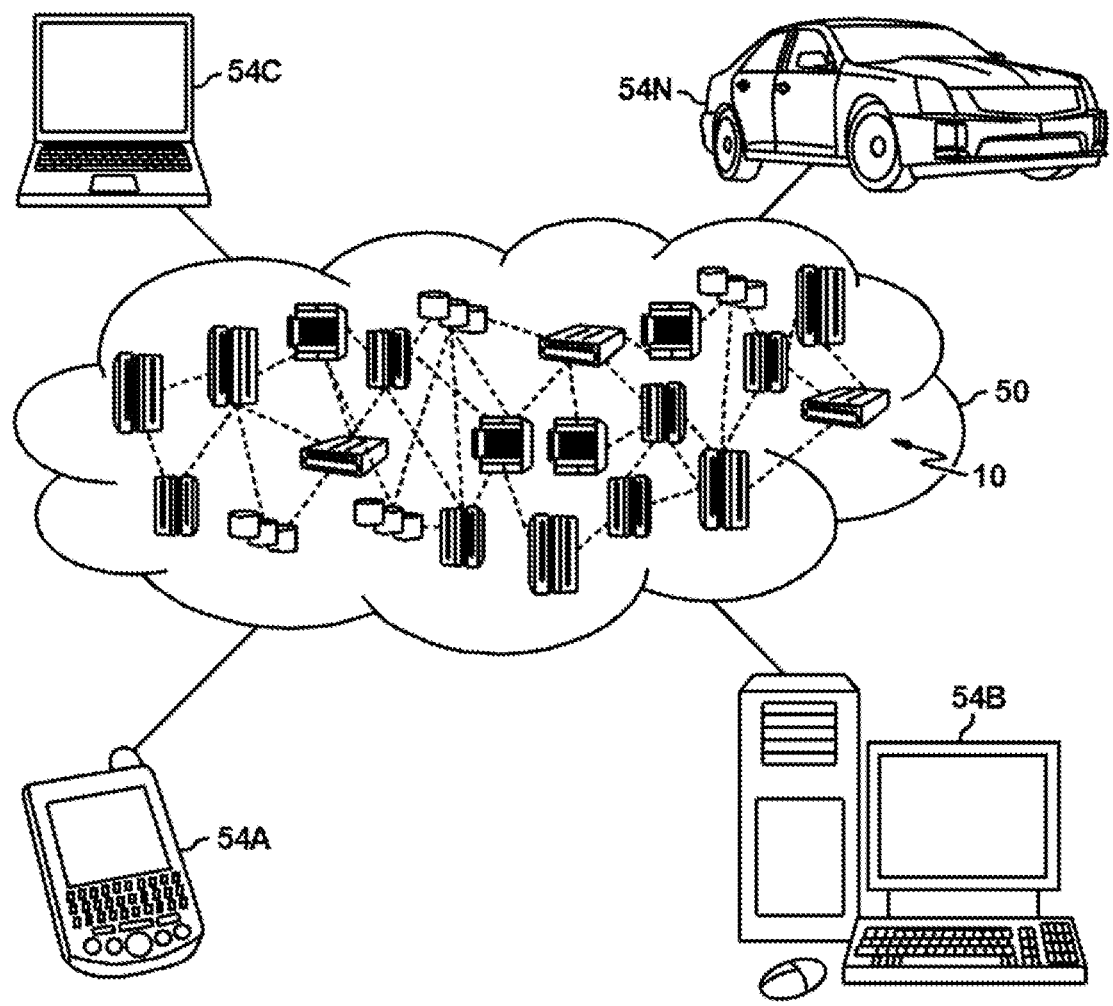
FIG. 1 is a schematic diagram illustrating a cloud computer environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments. In addition, it will be appreciated that, although specific embodiments have been described herein for purposes of illustration, various modifications may be made without departing from the spirit and scope of the embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
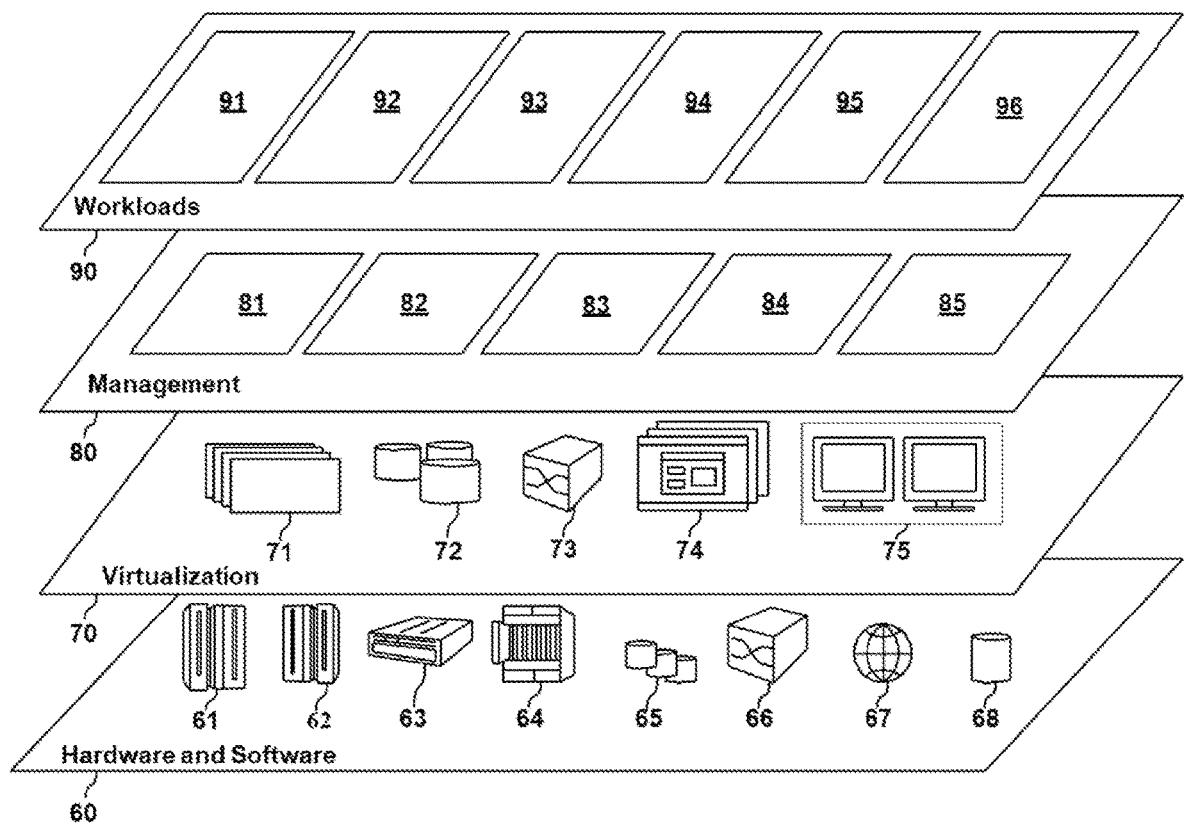
FIG. 2 is a block diagram illustrating a set of functional abstraction model layers provided by the cloud computing environment, in accordance with some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and to integrating communication between centralized systems and services with disparate devices and their respective non-standardized communications protocols and message specifications 96.

Figure 3:
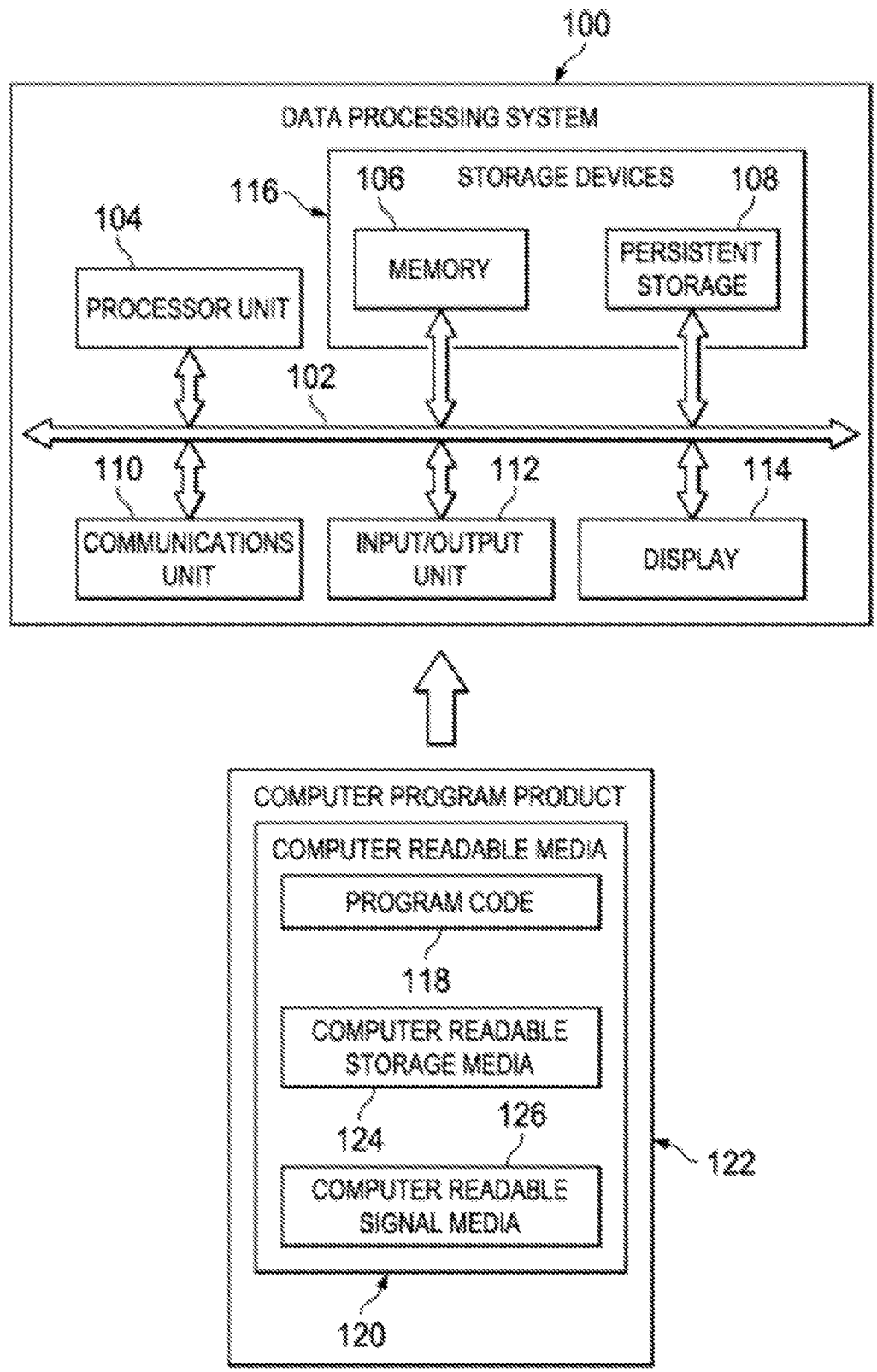
FIG. 3 is a block diagram illustrating a computer system/server that may be used as a cloud-based support system, to implement the processes described herein, in accordance with some embodiments of the present disclosure.

Referring to FIG. 3, a block diagram of an example data processing system, herein referred to as computer system 100, is provided. System 100 may be embodied in a computer system/server in a single location, or in at least one embodiment, may be configured in a cloud-based system sharing computing resources. For example, and without limitation, the computer system 100 may be used as a cloud computing node 10.

Aspects of the computer system 100 may be embodied in a computer system/server in a single location, or in at least one embodiment, may be configured in a cloud-based system sharing computing resources as a cloud-based support system, to implement the system, tools, and processes described herein. The computer system 100 is operational with numerous other general purpose or special purpose computer system environments or configurations. Examples of well-known computer systems, environments, and/or configurations that may be suitable for use with the computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computer system 100 may be described in the general context of computer system-executable instructions, such as program modules, being executed by the computer system 100. Generally, program modules may include routines, programs, objects, components, logic, data structures, and so on that perform particular tasks or implement particular abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 is shown in the form of a general-purpose computing device. The components of the computer system 100 may include, but are not limited to, one or more processors or processing devices 104 (sometimes referred to as processors and processing units), e.g., hardware processors, a system memory 106 (sometimes referred to as a memory device), and a communications bus 102 that couples various system components including the system memory 106 to the processing device 104. The communications bus 102 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 100 typically includes a variety of computer system readable media. Such media may be any available media that is accessible by the computer system 100 and it includes both volatile and non-volatile media, removable and non-removable media. In addition, the computer system 100 may include one or more persistent storage devices 108, communications units 110, input/output (I/O) units 112, and displays 114.

The processing device 104 serves to execute instructions for software that may be loaded into the system memory 106. The processing device 104 may be a number of processors, a multi-core processor, or some other type of processor, depending on the particular implementation. A number, as used herein with reference to an item, means one or more items. Further, the processing device 104 may be implemented using a number of heterogeneous processor systems in which a main processor is present with secondary processors on a single chip. As another illustrative example, the processing device 104 may be a symmetric multi-processor system containing multiple processors of the same type.

The system memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The system memory 106, in these examples, may be, for example, a random access memory or any other suitable volatile or non-volatile storage device. The system memory 106 can include computer system readable media in the form of volatile memory, such as random access memory (RAM) and/or cache memory.

The persistent storage 108 may take various forms depending on the particular implementation. For example, the persistent storage 108 may contain one or more components or devices. For example, and without limitation, the persistent storage 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the communication bus 102 by one or more data media interfaces.

The communications unit 110 in these examples may provide for communications with other computer systems or devices. In these examples, the communications unit 110 is a network interface card. The communications unit 110 may provide communications through the use of either or both physical and wireless communications links.

The input/output unit 112 may allow for input and output of data with other devices that may be connected to the computer system 100. For example, the input/output unit 112 may provide a connection for user input through a keyboard, a mouse, and/or some other suitable input device. Further, the input/output unit 112 may send output to a printer. The display 114 may provide a mechanism to display information to a user. Examples of the input/output units 112 that facilitate establishing communications between a variety of devices within the computer system 100 include, without limitation, network cards, modems, and input/output interface cards. In addition, the computer system 100 can communicate with one or more networks such as a local area network (LAN), a general wide area network (WAN), and/or a public network (e.g., the Internet) via a network adapter (not shown in FIG. 3). It should be understood that although not shown, other hardware and/or software components could be used in conjunction with the computer system 100. Examples of such components include, but are not limited to: microcode, device drivers, redundant processing units, external disk drive arrays, RAID systems, tape drives, and data archival storage systems.

Instructions for the operating system, applications and/or programs may be located in the storage devices 116, which are in communication with the processing device 104 through the communications bus 102. In these illustrative examples, the instructions are in a functional form on the persistent storage 108. These instructions may be loaded into the system memory 106 for execution by the processing device 104. The processes of the different embodiments may be performed by the processing device 104 using computer implemented instructions, which may be located in a memory, such as the system memory 106. These instructions are referred to as program code, computer usable program code, or computer readable program code that may be read and executed by a processor in the processing device 104. The program code in the different embodiments may be embodied on different physical or tangible computer readable media, such as the system memory 106 or the persistent storage 108.

The program code 118 may be located in a functional form on the computer readable media 120 that is selectively removable and may be loaded onto or transferred to the computer system 100 for execution by the processing device 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the computer system 100. In some instances, the computer readable storage media 124 may not be removable from the computer system 100.

Alternatively, the program code 118 may be transferred to the computer system 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or computer system through the computer readable signal media 126 for use within the computer system 100. For instance, program code stored in a computer readable storage medium in a server computer system may be downloaded over a network from the server to the computer system 100. The computer system providing the program code 118 may be a server computer, a client computer, or some other device capable of storing and transmitting the program code 118.

The program code 118 may include one or more program modules (not shown in FIG. 3) that may be stored in system memory 106 by way of example, and not limitation, as well as an operating system, one or more application programs, other program modules, and program data. Each of the operating systems, one or more application programs, other program modules, and program data or some combination thereof, may include an implementation of a networking environment. The program modules of the program code 118 generally carry out the functions and/or methodologies of embodiments as described herein.

The different components illustrated for the computer system 100 are not meant to provide architectural limitations to the manner in which different embodiments may be implemented. The different illustrative embodiments may be implemented in a computer system including components in addition to or in place of those illustrated for the computer system 100.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many known organizations and facilities include a myriad of centralized systems and services, typically arranged in hierarchical manner, and hereon grouped under the term "centralized systems." In general, many of the known centralized systems include compatible communication protocols and message specifications, thereby defining a substantially integrated communications infrastructure. However, many of the known supporting systems within these known organizations and facilities include disparate devices and services, sometimes referred to as interface systems, that are required to communicate efficiently and effectively with the centralized systems. Moreover, the disparate devices and services may include respective non-standardized communications protocols and message specifications that rely on serial hardware configurations to facilitate the aforementioned communications. The serialized communications connections between the interface systems and the respective centralized systems rely on the associated serialized, physical, and wired hardware connections to an application server located on the premises.

In some embodiments of known centralized systems, for example, in the hospitality industry, and specifically at hotel sites, each hotel has a centralized property management system (PMS) that includes broad coverage of activities, features, and services of the hotel including, without limitation, check-in, check-out, room transfer, guest name change, etc. The hotel will also include different types of on-premises known interface systems, i.e., guest service systems (GSSs) that need to communicate with the PMS to maintain synchronization of the GSSs with respect to the details of the status of the guests. For example, activating a room/garage/gym key card at the front desk through the PMS facilitates proper operation of the room locks, gym locks, and parking garage GSSs through the key card. Known GSSs include serial interfaces or Internet Protocol (IP)-based interfaces such as, without limitation, room key systems, voicemail, call accounting, private branch exchange (PBX), guest room entertainment (GRE), high speed internet access (HSIA), energy management systems, point of sale (POS) systems, parking garage systems, and any revenues collected through the GSSs that rely on the guest status details of the PMS for at least granting permissions to use the GSSs. At least a portion of the GSSs, that may be products of various vendors, include devices and services with non-standardized communication protocols and transaction message structures, thereby increasing the complexity of premises communications between the GSSs and the PMS and the uniqueness of each GSS in both hardware and software perspectives.

Some known entities desire to have substantially all of the GSSs and PMSs on their premises migrated to the cloud. However, the non-standardized communication protocols and transaction message structures hinder any large-scale migrations from the present serialized communications to cloud-based communications. For global entities with thousands of sites, the cost of integrating each serialized GSS with the varying software requirements into a cloud-based environment is cost-prohibitive, with some estimates in the tens of millions of US dollars, and in some cases, hundreds of millions of US dollars.

A system, computer program product, and method are disclosed and described herein for integrating communications between centralized systems and services with disparate devices and their respective non-standardized communications protocols and message specifications. Specifically, in embodiments, a software solution for the PMS/GSS migration to the cloud includes a universal systems communications interface adapter application (also referred to as "the adaptor") as presented herein to facilitate migration of existing PMSs and GSSs to the cloud. In addition, the universal interface adaptor facilitates cloud-based communications for newly installed GSSs. The adaptor is sufficiently robust to handle communications between on-premises distributed vendor GSSs and cloud-based PMSs, including hybrid cloud platforms and environments. In addition, the adaptor is a software application that facilitates communications between PMSs and GSSs regardless of the technical specifics of the respective GSS interfaces and interface specifications. Moreover, regardless of the technical specifics of the hardware communications coupling of the GSSs, including, without limitation, serial couplings and IP couplings, the adapter is universal in migration to cloud-based environments.

In embodiments, the adaptor application uses a process that is functionally divided into two distinct sub-processes, i.e., consolidation of the GSS interface specifications followed by standardization of the collected GSS interface specifications. The consolidation includes collecting substantially all of GSS interface specifications associated with the inventory of GSS interfaces. The collection is performed through gathering first GSS interface specifications for each facility or site extending across an entity's physical assets. For example, the first GSS interface may be a particular model of a key card reader manufactured by a particular vendor. An analysis on the associated initial first GSS interface specification includes identifying the logical properties therein through analysis of each section of the initial first GSS interface specification. The analyses of each section are executed through a generic parsing application at runtime, thereby rendering the systems and methods described herein substantially agnostic to the native languages of the GSS interfaces. The communications protocols and message specifications of each section of the initial first GSS interface specification are parsed and an initial first fragmented JSON file is generated for each section of the initial first GSS interface specification, where JSON is an abbreviation for JavaScript Object Notation. More specifically, an initial first fragmented JSON file for each logical property that is translated from the respective sections of the initial first GSS interface specification is created. The initial first fragmented JSON files will each include a key and a respective value, where each key is associated with the respective logical property. Accordingly, one or more initial first fragmented JSON files with initial first keys and initial first values are generated from an initial first GSS interface specification within a first PMS.

Each section of a subsequent first GSS interface specification in a second PMS is read in manner similar to the initial first GSS interface specification directed toward a key card reader that is substantially identical to that described above. In the event that a property of the subsequent first GSS interface specification is substantially similar to a key of the initial first fragmented JSON file, the value associated the subsequent similar key is incorporated for the corresponding key in the initial first fragmented JSON file. Therefore, the values for the identical property will be collected in a single fragmented JSON file. In the event that a property of the subsequent first GSS interface specification is different from a key of the initial first fragmented JSON file, a subsequent first fragmented JSON file is created with the associated key and value. Accordingly, as the similar first GSS interface specifications are analyzed serially from PMS-to-PMS, respective first fragmented JSON files are generated until the first GSS interface specifications in all of the PMSs are exhausted.

The collection of first fragmented JSON files, generated as described, are stored in a JSON configuration library, where the first fragmented JSON files are stored as reusable JSON components. Such storage of the fragmented JSON files in the JSON configuration library includes an indexing of the fragmented JSON files at least partially as a function of the logical properties within the first fragmented JSON files as embodied in the respective keys. In addition, a JSON configuration file is created and updated throughout the consolidation and standardization processes (discussed further below) that collects the fragmented JSON files to hold the standardized combined JSON strings for each GSS interface. The JSON configuration file is created and stored within the JSON configuration library. As fragmented JSON files are added or altered (through the described value alterations), the JSON configuration file is altered to reflect the changes.

Once all of the first GSS interfaces throughout substantially all of the PMSs have been analyzed and the respective fragmented JSON files have been created, the remaining GSS interfaces, e.g., garage card readers, POS devices, etc., are analyzed similarly in a serialized manner. Accordingly, the consolidation is completed when all the vendor interface specifications of the different PMS systems are read and the respective JSON configuration libraries are created, where the end products are consolidated logical JSON files (that remain fragmented) based on the respective vendor interface specifications.

Standardization includes comparing the inventory of consolidated logical JSON files to each other through analyzing each and every GSS interface, identifying the common properties, and extracting the respective consolidated logical JSON files. In addition, one or more stitched JSON files are assembled through combining two or more of the consolidated logical JSON files as a function of the respective logical properties and the respective GSS interface. The stitched JSON files are maintained within a reusable JSON configuration folder, where each file includes the full complement of consolidated logical JSON files to execute the proper operation of the respective GSS interface through one or more REST APIs. The stitched JSON files are updated and maintained within the reusable JSON configuration folder.

Figure 4:
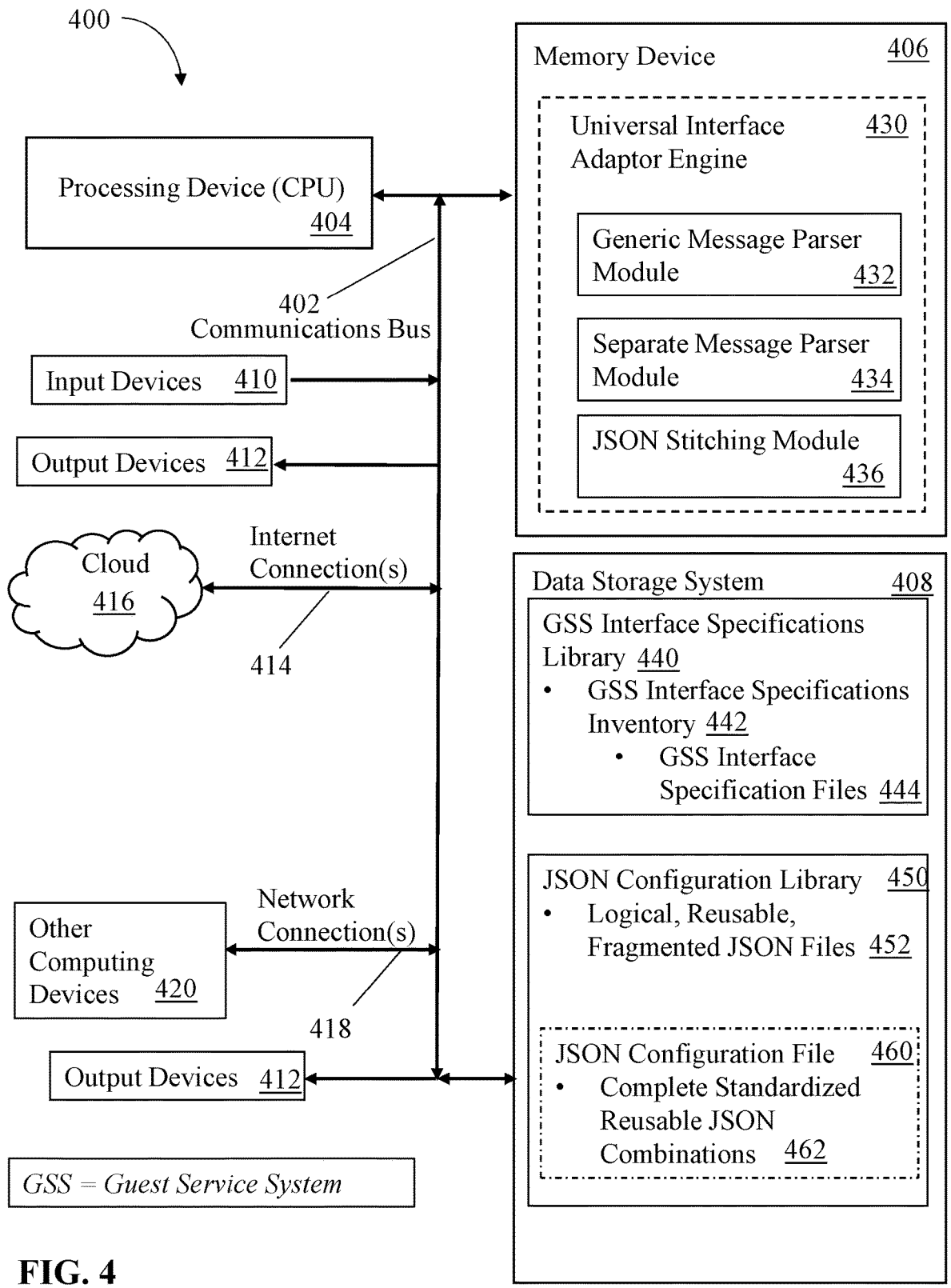
FIG. 4 is a block diagram illustrating a computer system configured for integrating communication between centralized systems and services with disparate devices and their respective non-standardized communications protocols and message specifications, in accordance with some embodiments of the present disclosure.

Referring to FIG. 4, a block diagram is provided illustrating a computer system, i.e., a universal interface adaptor system 400 (hereon referred to as "the system 400") that is configured for integrating communication between centralized systems and services with disparate devices and their respective non-standardized communications protocols and message specifications. The system 400 includes one or more processing devices 404 (only one shown) communicatively and operably coupled to one or more memory devices 406 (only one shown). The system 400 also includes a data storage system 408 that is communicatively coupled to the processing device 404 and memory device 406 through a communications bus 402. In one or more embodiments, the communications bus 402, the processing device 404, the memory device 406, and the data storage system 408 are similar to their counterparts shown in FIG. 3, i.e., the communications bus 102, the processing device 104, the system memory 106, and the persistent storage devices 108, respectively. The system 400 further includes one or more input devices 410 and one or more output devices 412 communicatively coupled to the communications bus 402. In addition, the system 400 includes one or more Internet connections 414 (only one shown) communicatively coupled to the cloud 416 through the communications bus 402, and one or more network connections 418 (only one shown) communicatively coupled to one or more other computing devices 420 through the communications bus 402. In some embodiments, the Internet connections 414 facilitate communication between the system 400 and one or more cloud-based centralized systems and/or services (not shown in FIG. 4, and discussed further with respect to FIGS. 5 through 9.

In one or more embodiments, a universal systems communications interface adapter application, hereon referred to as a universal interface adaptor engine 430, or the adaptor 430, is resident within the memory device 406 to facilitate migration of existing PMSs and GSSs to the cloud 416. A generic message parser module 432 and a separate message parser module 434 are embedded within the adaptor 430, and the parser modules 432 and 434 are described further with respect to FIG. 7. In addition, the adaptor 430 includes a JSON stitching module 436 that is discussed further with respect to FIG. 8.

In at least some embodiments, the data storage system 408 provides storage to objects such as, and without limitation, a GSS interface specification library 440 that includes a GSS interface specifications inventory 442 that contains the GSS interface specification files 444. The GSS interface specification library 440, GSS interface specifications inventory 442, and GSS interface specification files 444 are discussed further with respect to FIGS. 5 through 8. The data storage system 408 further provides storage to objects such as, and without limitation, a JSON configuration library 450, a plurality of logical, reusable, fragmented interface JSON files 452, a JSON configuration file 460, and complete standardized reusable interface JSON files 462. The JSON configuration library 450, fragmented JSON files 452, JSON configuration file 460, and complete standardized reusable interface JSON files 462 are discussed further with respect to FIGS. 5 through 9.

Figure 5:
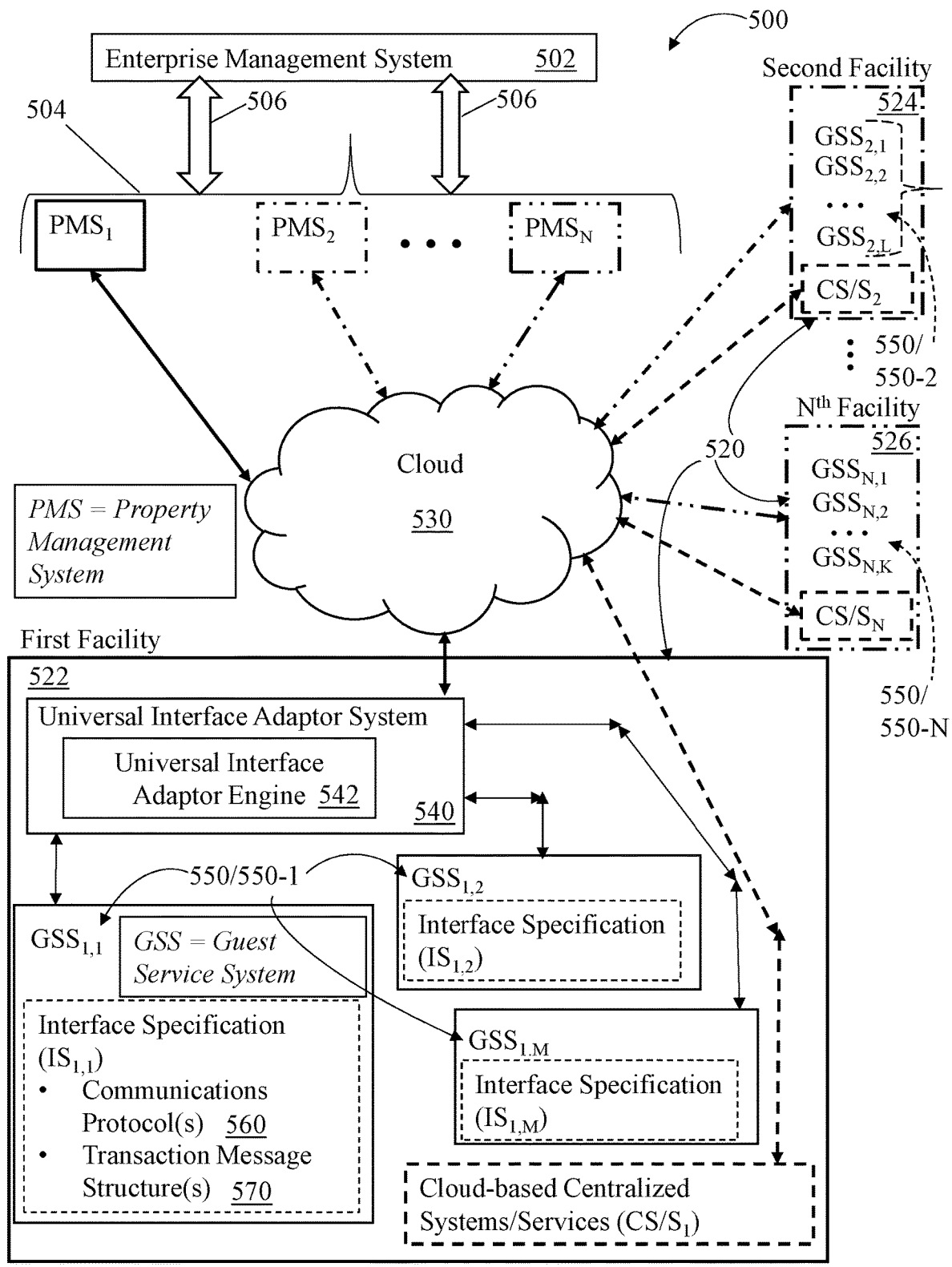
FIG. 5 is a block diagram illustrating an example relationship between a plurality of property management systems (PMSs) and respective on-premises guest service systems (GSSs), in accordance with some embodiments of the present disclosure.

Referring to FIG. 5, a block diagram is provided illustrating an example enterprise-wide architecture 500 that shows the relationship between a plurality of property management systems (PMSs) and respective on-premises guest service systems (GSSs). In embodiments, the enterprise-wide architecture 500 defines any architectural structure, including, and without limitation, substantially hierarchical, as shown in FIG. 5. The enterprise-wide architecture 500 includes an enterprise management system (EMS) 502 that collects at least a portion of the data generated by and transmitted from a plurality of centralized systems, i.e., PMSs 504, hereon referred to as PMSs 504. Specifically, the EMS 502 is communicatively coupled to a first PMS, i.e., $PMS_1$, a second PMS, i.e., $PMS_2$, and up to an $N^{th}$ PMS, i.e., $PMS_N$. The communications between the communicatively coupled PMSs 504 and the EMS 502 are embodied in any communications channels 506 using any communications methods that enable operation of the adaptor 430 as described herein.

In embodiments, the enterprise-wide architecture 500 also includes a plurality of facilities 520, including a first facility 522, a second facility 524, and an $N^{th}$ facility 526. The first facility 522 is communicatively coupled, and in some embodiments, operatively coupled to the $PMS_1$ through the cloud 530, which is similar to the cloud 416, through any communications channels similar to communications channels 506 using any communications methods that enable operation of the adaptor 430 as described herein. The first facility 522 includes at least a portion 540 of the system 400, that includes a substantially complete engine 542 (shown as 430 in FIG. 4). The portion 540 of the system 400 and the engine 542 are communicatively coupled to the $PMS_1$ through the cloud 530.

The enterprise-wide architecture 500 further includes a plurality of interface systems, i.e., GSS interfaces 550 that are distributed throughout the plurality of PMSs 504. Each GSS interface 550 includes the hardware features of the respective system or service and the functional code thereof as received from the respective vendor. For example, and without limitation, for those embodiments that include hotel facilities, the GSS interfaces 550 may include devices such as key card readers for guest hotel rooms, exercise rooms, pool rooms, and garages. Such devices may also include point-of-sale (POS) devices within dining facilities, vending machines, and souvenir shops. Each GSS interface 550 also includes the vendor-supplied documentation of the respective GSS interface 550 in any format, including, without limitation, physical manuals (scanned), soft manuals, and the functional code in a respective software format. In some embodiments, for those GSS interfaces 550 that are delivered without the respective GSS interface specifications, GSS interface specifications may be created through any method that enables operation of the adaptor 542 (430 in FIG. 4) as described herein.

Specifically, with respect to the plurality of GSS interfaces 550, the first facility 522 includes a first plurality of GSS interfaces 550-1, associated with the $PMS_1$. The first plurality of GSS interfaces 550-1 includes a first GSS interface, i.e., a $GSS_{1,1}$ interface with a corresponding first interface specification file $IS_{1,1}$. The first interface specification file $IS_{1,1}$ includes the vendor-supplied documentation of the $GSS_{1,1}$ interface in any format as described above. The first plurality of GSS interfaces 550-1 also includes a second GSS interface, i.e., a $GSS_{1,2}$ interface with a corresponding second interface specification file $IS_{1,2}$. The first plurality of GSS interfaces 550-1 further includes additional GSS interfaces up to, and including, an $M^{th}$ GSS interface, i.e., a $GSS_{1,M}$ with a corresponding $M^{th}$ interface specification file $IS_{1,M}$. The first facility 552 further includes one or more first cloud-based centralized systems and/or services, i.e., CS/S$_1$ that were originally installed as cloud-capable and do not require the engine 542 to communicate with the PMS$_1$ through the cloud 530.

Also, with respect to the plurality of GSS interfaces 550, the second facility 524 includes a second plurality of GSS interfaces 550-2, associated with the PMS$_2$. The second plurality of GSS interfaces 550-2 includes a first GSS interface, i.e., a GSS$_{2,1}$ interface with a corresponding first interface specification file IS$_{2,1}$. The first interface specification file IS$_{2,1}$ includes the vendor-supplied documentation of the GSS$_{2,1}$ interface in any format as described above. The second plurality of GSS interfaces 550-2 also includes a second GSS interface, i.e., a GSS$_{2,2}$ interface with a corresponding second interface specification file IS$_{2,2}$. The second plurality of GSS interfaces 550-2 further includes additional GSS interfaces up to, and including, a L$^{th}$ GSS interface, i.e., a GSS$_{1,L}$ with a corresponding L$^{th}$ interface specification file IS$_{1,L}$. The second facility 524 further includes one or more second cloud-based centralized systems and/or services, i.e., CS/S$_2$ that were originally installed as cloud-capable and do not require the engine 542 to communicate with the PMS$_2$ through the cloud 530.

Further, with respect to the plurality of GSS interfaces 550, the N facility 526 includes an N$^{th}$ plurality of GSS interfaces 550-N, associated with the PMS$_N$. The N$^{th}$ plurality of GSS interfaces 550-N includes a first GSS interface, i.e., a GSS$_{N,1}$ interface with a corresponding first interface specification file IS$_{N,1}$. The first interface specification file IS$_{N,1}$ includes the vendor-supplied documentation of the GSS$_{N,1}$ interface in any format as described above. The N$^{th}$ plurality of GSS interfaces 550-N also includes a second GSS interface, i.e., a GSS$_{N,2}$ interface with a corresponding second interface specification file IS$_{N,2}$. The N$^{th}$ plurality of GSS interfaces 550-N further includes additional GSS interfaces up to, and including, a K$^{th}$ GSS interface, i.e., a GSS$_{N,K}$ with a corresponding K$^{th}$ interface specification file IS$_{N,K}$. The third facility 526 further includes one or more N$^{th}$ cloud-based centralized systems and/or services, i.e., CS/S$_N$ that were originally installed as cloud-capable and do not require the engine 542 to communicate with the PMS$_N$ through the cloud 530.

In some embodiments, the contents and the sequence of the pluralities of GSS interfaces 550-1, 550-2, . . . , 550-N are identical. In some embodiments, one or more of the number of GSS interfaces, the content of one or more GSS interface specification files, and the sequence of the GSS interfaces and their specification files are different. For example, and without limitation, the GSS$_{1,1}$ interface may be for the POS systems in the PMS$_1$ and the GSS$_{1,2}$ interface may be for the key card readers in the PMS$_1$. In contrast, for the PMS$_2$, the GSS$_{2,1}$ interface may be for the key card readers and the GSS$_{2,2}$ interface may be for the POS systems.

In embodiments, each GSS interface specification file of the pluralities of GSS interfaces 550 includes one or more communications protocols 560 and one or more transaction message structures 570. For clarity, the communications protocols 560 and transaction message structures 570 are shown in IS$_{1,1}$, and they are discussed further herein with respect to FIG. 6.

In general, enterprise management systems (EMSs) are large-scale software packages that track and control the complex operations of a business entity. In some embodiments, they are used as a central command center, automating the organization, and making it convenient to prepare reports and make decisions. Information transmitted across the communications channels may include, in a non-limiting manner, gross receipts from each of the facilities 520 and "all-hands/widest dissemination" directives from the EMS 502. In some embodiments, e.g., for the hospitality industry, and as described above, the enterprise includes a global network of hotel sites, or hotel facilities, where each hotel facility includes a respective PMS. The plurality of GSS interfaces 550 may include, in addition to the previously described key card and POS systems, and without limitation, voicemail, call accounting, private branch exchange (PBX), guest room entertainment (GRE), high speed internet access (HSIA), energy management systems, and any revenues collected through the GSS interfaces that rely on the guest status details of the PMS$_1$ for at least granting permissions to use the respective GSS interfaces 550.

As described herein, the systems and methods are applied to those embodiments directed to the hospitality industry. However, similar to hospitality industry, the systems and methods described herein may be applied to any use case where there are legacy sensors, devices, and interfaces that communicate through a centralized infrastructure.

In some embodiments, e.g., for an electric power transmission and distribution utility, the enterprise includes a plurality of electric substations, where each substation includes at least a portion of a respective substation management system. The GSS interfaces of the substation management system may include, without limitation, individual circuit breaker controls, individual transformer controls, individual switch controls, and any respective metering. In some embodiments, e.g., for an electric power generation utility, the enterprise includes a plurality of electric power generation facilities, where each electric power generation facility includes at least a portion of an electric power generation management system. The GSS interfaces for the electric power generation facilities may include, without limitation, electric dispatch orders for individual generating units, generating unit status, and metering for electric power output. In some embodiments, e.g., for a conglomerate, the enterprise includes a plurality of manufacturing facilities, where each manufacturing facility includes a respective manufacturing management system. In some embodiments, similar analogies and examples may include nationwide and/or global warehouse enterprises with a network of distributed warehouses. The GSS interfaces for the warehouses may include, without limitation, article scanning devices, merchandise transport equipment (e.g., forklifts), and transport arrival/departure notification devices.

Figure 6:
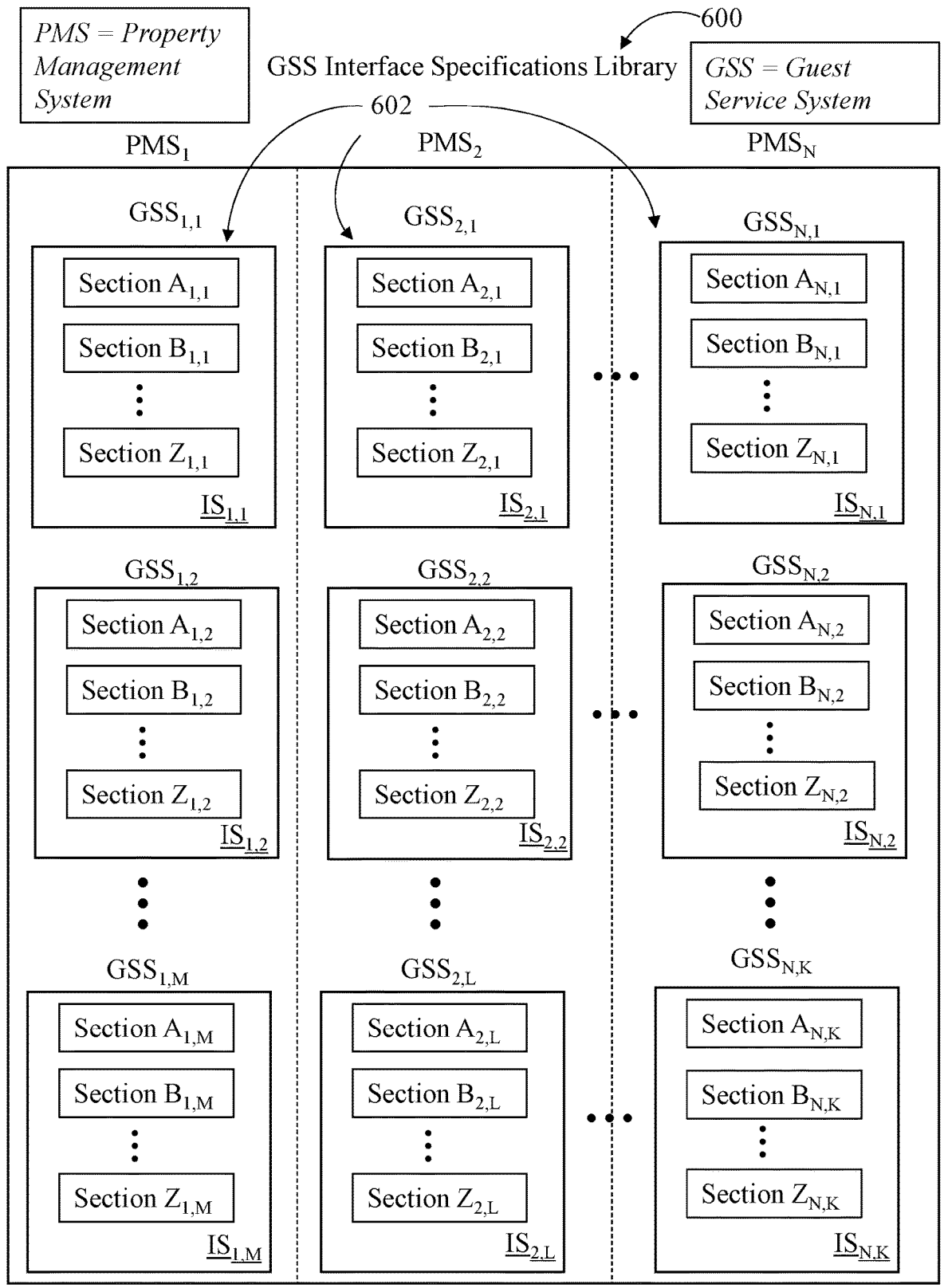
FIG. 6 is a block diagram illustrating a GSS interface specification library, in accordance with some embodiments of the present disclosure

Referring to FIG. 6, a block diagram is provided illustrating a GSS interface specification library 600. Also referring to FIGS. 4 and 5, the GSS interface specification library 600 (shown as 440 in FIG. 4) includes substantially the full inventory 442 of GSS interface specification files 602 (444 in FIG. 4) for the entire enterprise across the plurality of PMSs 504. More specifically, the GSS interface specification files 602 for PMS$_1$ from the range of GSS interfaces ranging from GSS$_{1,1}$ to GSS$_{1,M}$, for PMS$_2$ ranging from GSS$_{2,1}$ to GSS$_{2,L}$, and for PMS$_N$ ranging from GSS$_{N,1}$ to GSS$_{N,K}$ are collected and stored within the GSS interface specification library 600. In some embodiments, one or more of the maximum values represented by M, L, and K are different values. The number of N PMSs is provided for discussion and in some embodiments there are only one or two PMSs.

The GSS interface specification file IS$_{1,1}$ for the GSS interface GSS$_{1,1}$ includes a plurality of sections, i.e., section A through section Z, where the number of 26 sections is non-limiting. The GSS interface specification files IS$_{1,2}$ through IS$_{1,M}$ also associated with the GSS interfaces $GSS_{1,2}$ and $GSS_{1,M}$, respectively, are similarly configured. Moreover, the GSS interface specification files $IS_{2,1}$, $IS_{2,2}$, through $IS_{2,L}$ associated with the GSS interfaces $GSS_{2,1}$, $GSS_{2,2}$, through $GSS_{2,L}$, respectively, are similarly configured. Furthermore, the GSS interface specification files $IS_{N,1}$, $IS_{N,2}$, through $IS_{N,K}$ associated with the GSS interfaces $GSS_{N,1}$, $GSS_{N,2}$, through $GSS_{N,K}$, respectively, are similarly configured.

Each GSS interface specification file 602 may have any number of sections that enables operation of the adaptor 542 (430 in FIG. 4) as described herein. The use of 26 sections for each of the GSS interface specification files 602 through identifying each section with a letter of the alphabet is for ease of discussion and clarity. As a function of the disparate devices that are associated with the respective GSS interfaces 550, each section of each GSS interface specification file $IS_{1,1}$ through $IS_{N,K}$ may have different technical documentation within than any other section of any GSS interface specification 602 within the GSS interface specification library 600. In some embodiments, even subtly disparate devices may differ, including for those GSS interface specifications for otherwise substantially similar GSS interfaces 550. In one or more embodiments, the GSS interfaces 550 are provided and supported by a great variety of different vendors, therefor the GSS interface specification files 602 are vendor-provided and will likely vary greatly with respect to the information provided due to the disparate natures, purposes, and features of the respective GSS interfaces 550.

Each GSS interface specification file 602 ($IS_{1,1}$, et al. in FIG. 5) includes respective non-standardized communications protocols as elected by the respective vendors such that the communications protocols 560 for each may, or may not, be a common protocol and a great number of possible protocols may be used. Therefore, attainment of a suite of standardized vendor-provided communications protocols is not likely. In addition, due to the disparate natures, purposes, and features of the respective GSS interfaces 550, the transaction message structures 570, including the specification sections, for those messages to induce the respective devices to respond accordingly to the programmed instructions for the applicable situations and circumstances. At least a portion of the aforementioned sections of the GSS interface specification files 602 include one or more of the respective messages, where the messages may vary not only to the content, but also to, and without limitation, message name, message type, message length, and message format. Accordingly, as described further herein, the analyses of the GSS interface specification files 602 are executed on a section-by-section basis.

Figure 7A:
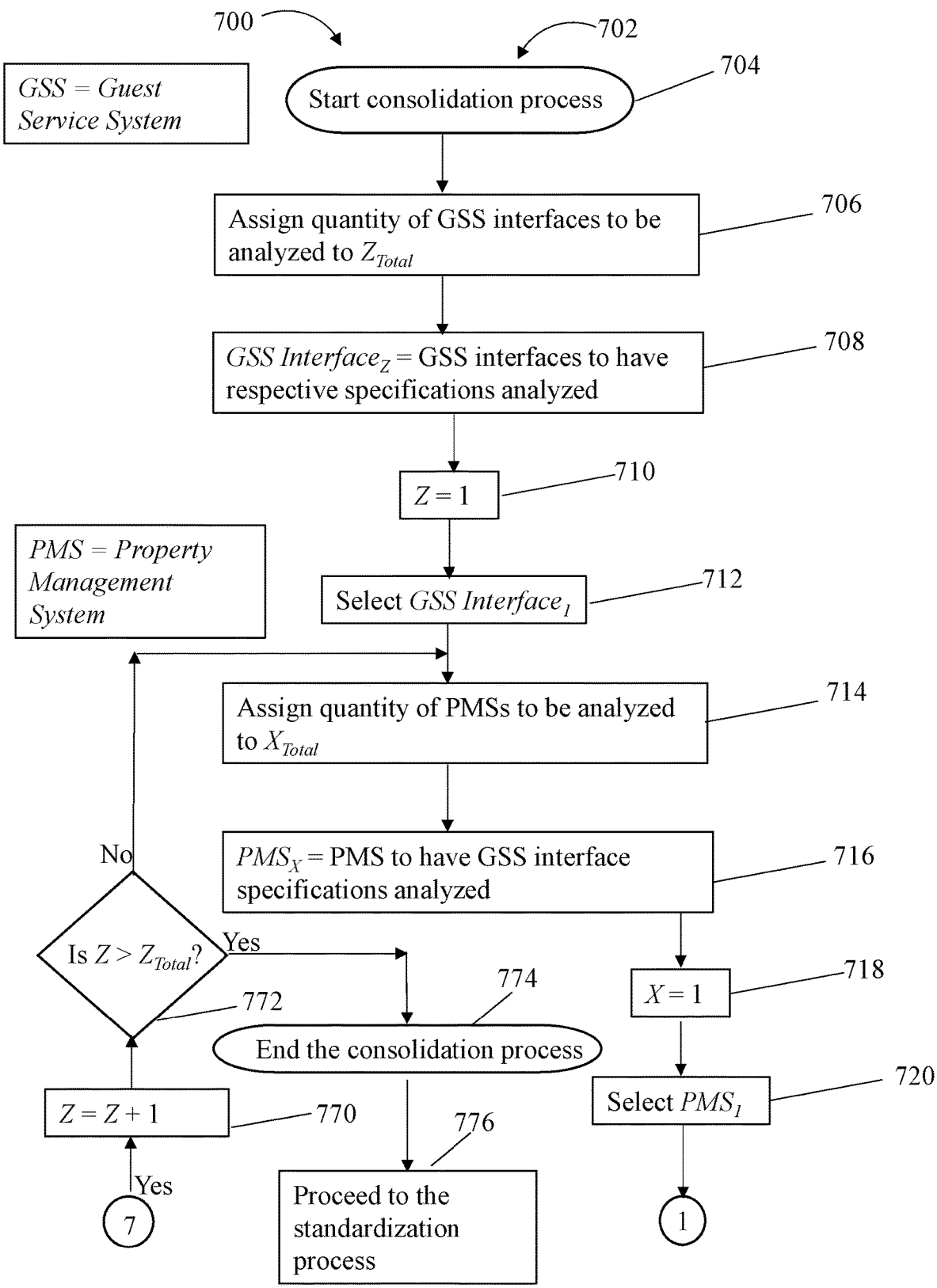
FIG. 7A is a flowchart illustrating a first portion of a process for integrating centralized systems and services with disparate devices and their respective non-standardized communications protocols and message specifications, in accordance with some embodiments of the present disclosure.

Referring to FIG. 7A, a flowchart is provided illustrating a first portion 702 of a process 700 for integrating centralized systems and services with disparate devices and their respective non-standardized communications protocols and message specifications. As previously described, the process 700 includes a first portion 702, hereon referred to as the consolidation process 702. The process 700 also includes a second portion 802, i.e., a standardization process 802, as described further with respect to FIG. 8. As further described herein, the process 700 is fully automated, including the consolidation process 702 and the standardization process 802.

Also referring to FIGS. 4, 5, and 6, the process 700 includes a consolidation process start operation 704. In general, the universal interface adaptor engine 542 is in service substantially continuously to automatically execute the process 700 as the respective GSS interface specifications 602 are updated or new GSS interfaces specifications 602 are added as a function of maintenance in, or replacement of, the infrastructure associated with the GSS interfaces 550.

The consolidation process 702 includes assigning 706 the variable $Z_{Total}$ to represent a quantity of GSS interfaces 550 to be analyzed. The variable GSS Interface$_Z$ is individually assigned 708 to each of the GSS interfaces 550 to be analyzed. A corresponding GSS interface 550 variable, Z, is initialized 710 at 1. Therefore, a GSS Interface$_1$ is selected 712 for analysis within the consolidation process 702. For an example, the GSS Interface$_1$ is a POS. As used herein, the variable Z does not necessarily have any relationship with the variables X and Y for the designation $GSS_{X,Y}$, where the variable X is representative of the respective $PMS_X$ and the variable Y is representative of the respective GSS interface within the respective PMS. Therefore, for example, the GSS Interface$_1$ may have no direct relationship with the GSS interface $GSS_{1,1}$. In general, the identity of which GSS interface $GSS_{X,Y}$ and the associated GSS interface specification file $IS_{X,Y}$ is associated with each of the GSS Interfaces$_Z$ of POS systems, key card readers, etc., are known.

The consolidation process 702 also includes assigning 714 the variable $X_{Total}$ to represent a quantity of PMSs 504 to be analyzed. In one or more embodiments, only one PMS 504 will be identified for the pending analyses. In at least one embodiment, a plurality of PMSs 504 will be identified for the pending analyses. The variable $PMS_X$ is individually assigned 716 to each of the PMSs 504 to be analyzed. A corresponding PMS variable, X, is initialized 718 at 1. Accordingly, $PMS_1$ is selected 720 for analysis within the consolidation process 702.

Figure 7B:
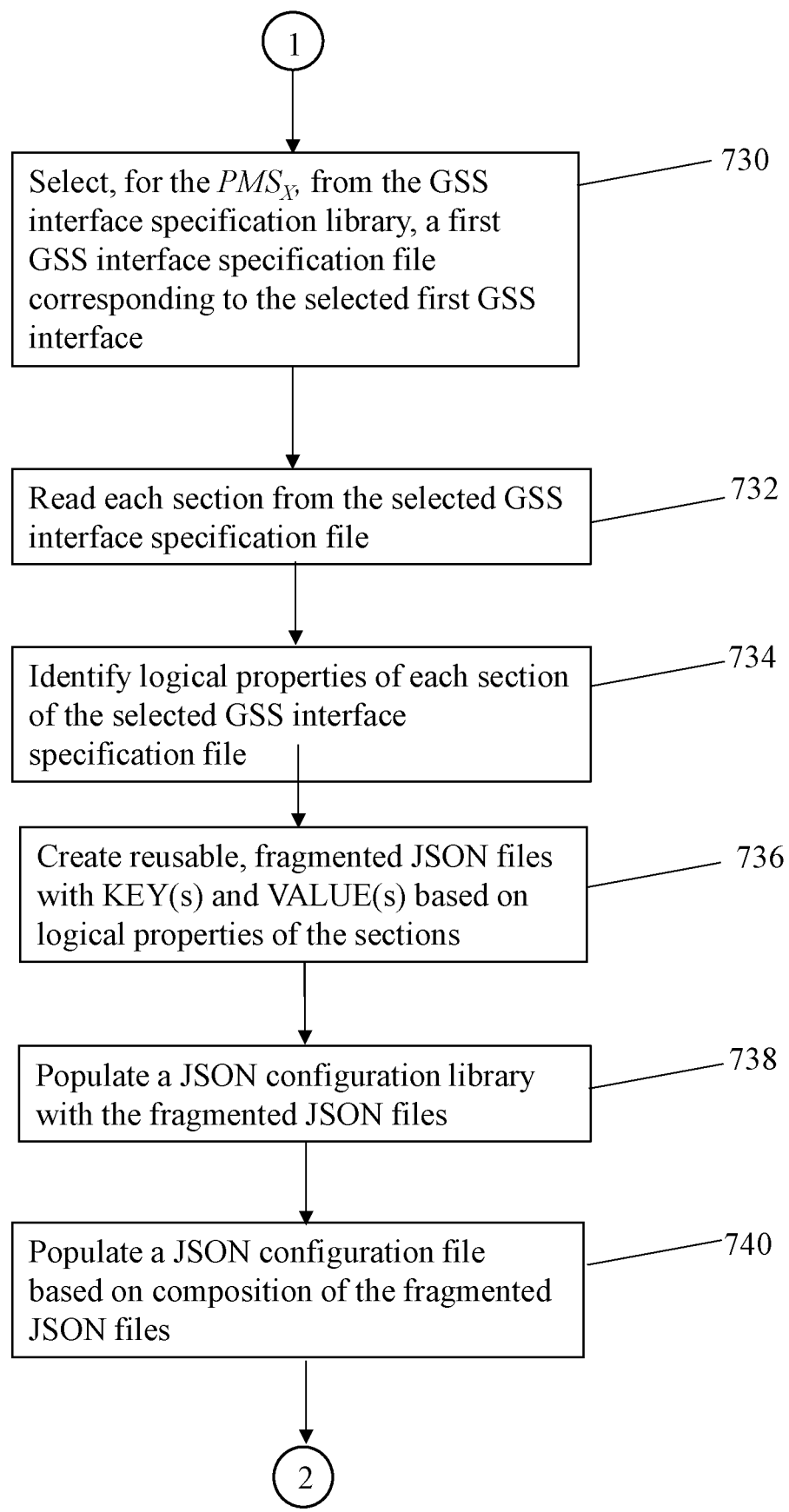
FIG. 7B is a continuation of the flowchart from FIG. 7A, in accordance with some embodiments of the present disclosure.

Referring to FIG. 7B, a continuation of the flowchart illustrating the process 702 from FIG. 7A is provided, and continuing to refer to FIGS. 4, 5, 6, and 7A, for the selected $PMS_X$, i.e., $PMS_1$, a first GSS interface specification file from the GSS interface specification library 600, corresponding to the selected first GSS interface i.e., GSS Interface$_1$, is selected. More specifically, one of the GSS interface specification files $IS_{1,1}$ through $IS_{1,M}$ (as shown in FIG. 6) is selected based on prior knowledge of a relationship between the respective GSS interface (here, GSS Interface$_1$, i.e., a POS) and the respective GSS interface specification file 602 associated with the $PMS_1$. For the example, the selected GSS interface specification file 602 is the GSS interface specification file $IS_{1,1}$. Each section of the selected GSS interface specification file $IS_{1,1}$ is read 732 from section $A_{1,1}$ through section $Z_{1,1}$ (as shown in FIG. 6).

As the sections are read 732, the logical properties in each are identified 734. The analyses of each section are executed at runtime through a generic parsing application through the generic message parser module 432, thereby rendering the universal interface adaptor engine 542 and the process 700 as described herein substantially agnostic to the native programming languages and communications protocols of the GSS interfaces. In some embodiments, one or more particular vendors may have provided one or more GSS interfaces where there is no commonality of the fragmented JSONs from interface-to-interface. For such embodiments, one or more separate vendor-specific parsers, i.e., the separate message parser module 434, may be used for those vendors. The communications protocols and message specifications of each section of the initial first GSS interface specification file $IS_{1,1}$ are parsed and an initial first fragmented JSON file (see FIG. 9) is generated for each section of the initial first GSS interface specification file $IS_{1,1}$. More specifically, a reusable initial first fragmented JSON file for each logical property that is translated from the respective sections of the initial first GSS interface specification file $IS_{1,1}$ is created 736. The initial first fragmented JSON files will each include one or more keys and one or more respective values, where each key is associated with the respective logical property. Accordingly, one or more initial first fragmented JSON files with initial first keys and initial first values are generated from the initial first GSS interface specification file $IS_{1,1}$.

Figure 9:
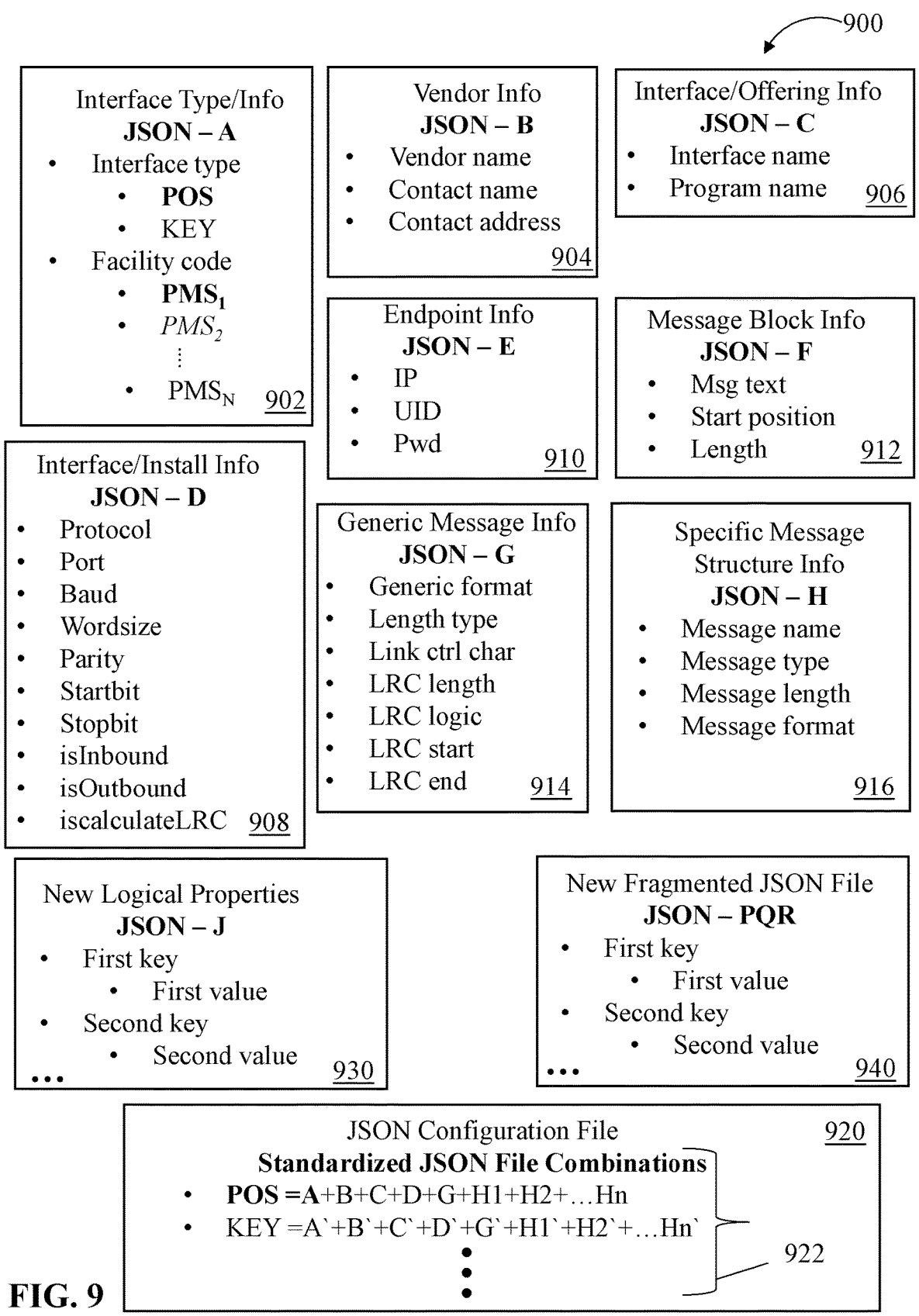
FIG. 9 is a tabular diagram illustrating an example set of logical functions for GSS interface specifications defining a JSON configuration library, in accordance with some embodiments of the present disclosure.

Referring to FIG. 9, a tabular diagram is presented illustrating an example set of logical functions for the initial first GSS interface specification file $IS_{1,1}$ defining a JSON configuration library 900 (shown as 450 in FIG. 4). For example, the first fragmented JSON file, i.e., JSON-A 902 includes the logical property "Interface Type/Info" with the logical properties, or keys "interface type" and "Facility code", as well as examples of the values for the keys, i.e., values of "POS" and "KEY" for the interface type key and values of $PMS_1 \ldots PMS_N$ for the facility code key. Additional fragmented JSON files include those for additional logical properties such as vendor information (JSON-B 904), interface/offering information (JSON-C 906), interface/installation information (JSON-D 908), endpoint info (JSON-E 910), message block information (JSON-F 912), generic message information (JSON-G 914), and specific message structure information (JSON-H 916). Accordingly, the JSON configuration library 900 is populated 738 with the logical, reusable, fragmented JSON files JSON-A 902 through JSON-H 916 (shown as 452 in FIG. 4) that may be identified as reusable JSON components.

In one or more embodiments, for the fragmented JSON file JSON-A 902, the value of "POS" is indicative of the first PMS to be analyzed, i.e., "$PMS_1$" (both bolded in FIG. 9 for clarity). Notably, example values of the respective keys for the fragmented JSON files JSON-B 904 through JSON-H 916 are not provided. Therefore, the fragmented JSON file JSON-A 902 is discussed further. Specifically, the value of "POS" for the interface type key represents the first GSS interface as a point-of-sale (POS) GSS interface as collected from the analysis of one or more of the sections $A_{1,1}$ to $Z_{1,1}$ of the GSS interface specification $GSS_{1,1}$. The value of $PMS_1$ is collected for the facility code key to identify that this particular POS interface is found at least in $PMS_1$.

In at least some embodiments, a JSON configuration file 920 (shown as 460 in FIG. 4) is populated 740 with a plurality of complete, standardized, reusable JSON file combinations 922 (shown as 462 in FIG. 4). The JSON configuration file 920 and the standardized JSON file combinations 922 are discussed further with respect to the standardization process 802 (see FIG. 8).

Figure 7C:
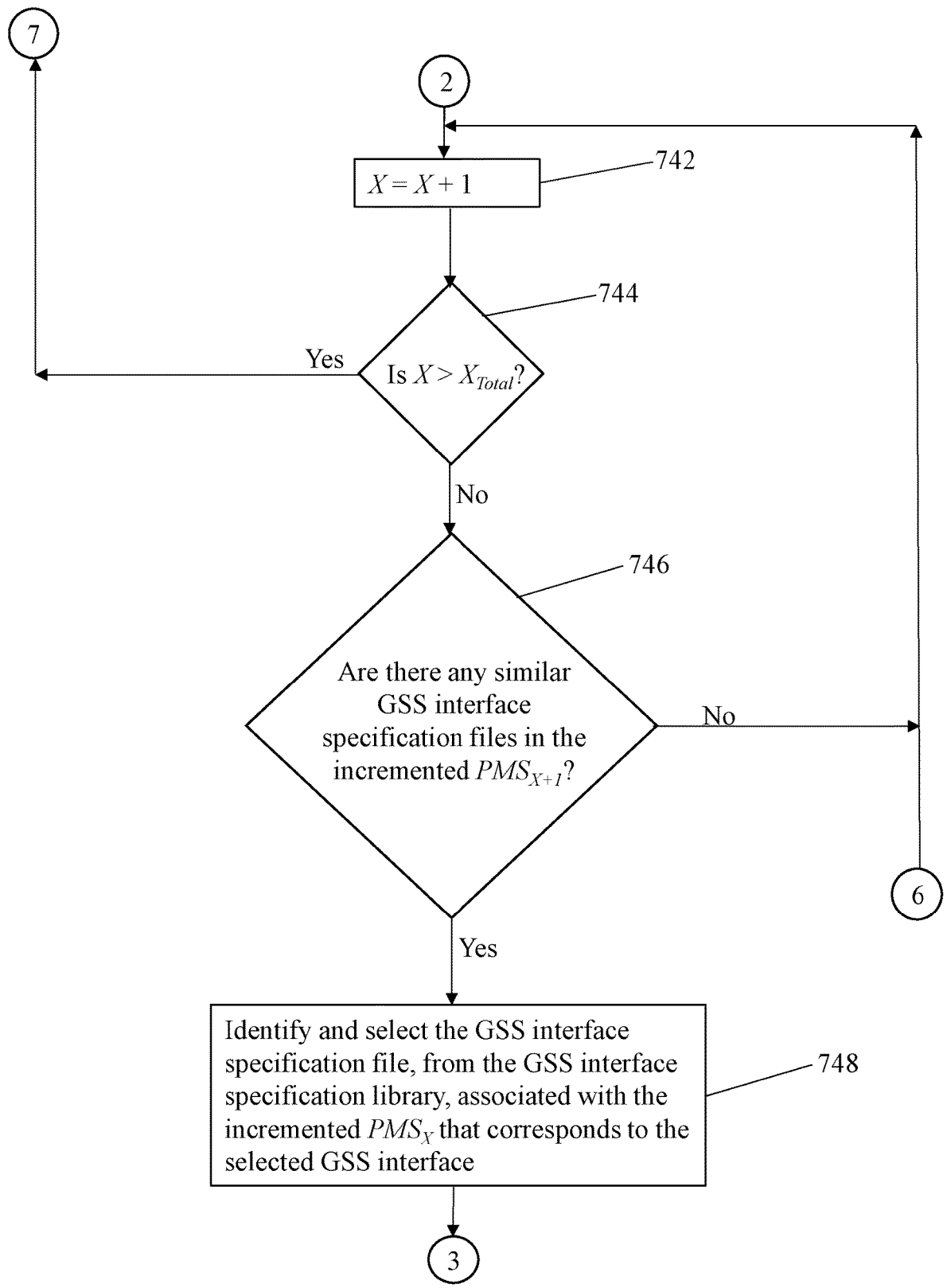
FIG. 7C is a continuation of the flowchart from FIG. 7B, in accordance with some embodiments of the present disclosure.

Referring to FIG. 7C, a continuation of the flowchart illustrating the process 702 from FIG. 7B is provided, and continuing to refer to FIGS. 4, 5, 6, 7A, and 7B, in at least some embodiments, subsequent to the JSON configuration file population operation 740, the PMS counting variable X is incremented 742. Subject to the PMS counting variable X incrementing operation 742, a determination operation 744 is executed to determine if all of the PMSs represented by $PMS_X$ have been subject to analysis as described herein. More specifically, a determination is directed toward determining if all of the PMSs 504 have been analyzed for a GSS interface specification file 602 at least partially associated with the first GSS interface, i.e., GSS Interface₁ (POS).

A negative response ("No") to the determination operation 744 advances the process 702 to the next operation, i.e., a determination operation 746 that determines if there are any similar GSS interface specification files 602 for a POS interface in the incremented $PMS_{X+1}$. For a negative response ("No"), the process 702 returns to the incrementing operation 742. For a positive response ("Yes"), the process 702 proceeds to the next operation where a GSS interface specification file 602 from the group including, for example, $IS_{2,1}$ through $IS_{2,L}$, is identified 748 and selected from the GSS interface specification library 600. For example, if the first GSS interface specification file associated with $PMS_1$, e.g., GSS interface specification $IS_{1,1}$, is directed toward a POS interface, then the selected subsequent GSS interface specification file associated with the $PMS_2$, e.g., $IS_{2,1}$, will also be directed to a POS interface. Therefore, the identified and selected GSS interface specification file $IS_{2,1}$ within the incremented $PMS_2$ corresponds to the first GSS interface, i.e., GSS Interface₁. In some embodiments, the GSS interface specification files $IS_{1,2}$ and $IS_{2,1}$ are substantially similar. In some embodiments, the GSS interface specification files $IS_{1,2}$ and $IS_{2,1}$ are only partially similar.

Figure 7D:
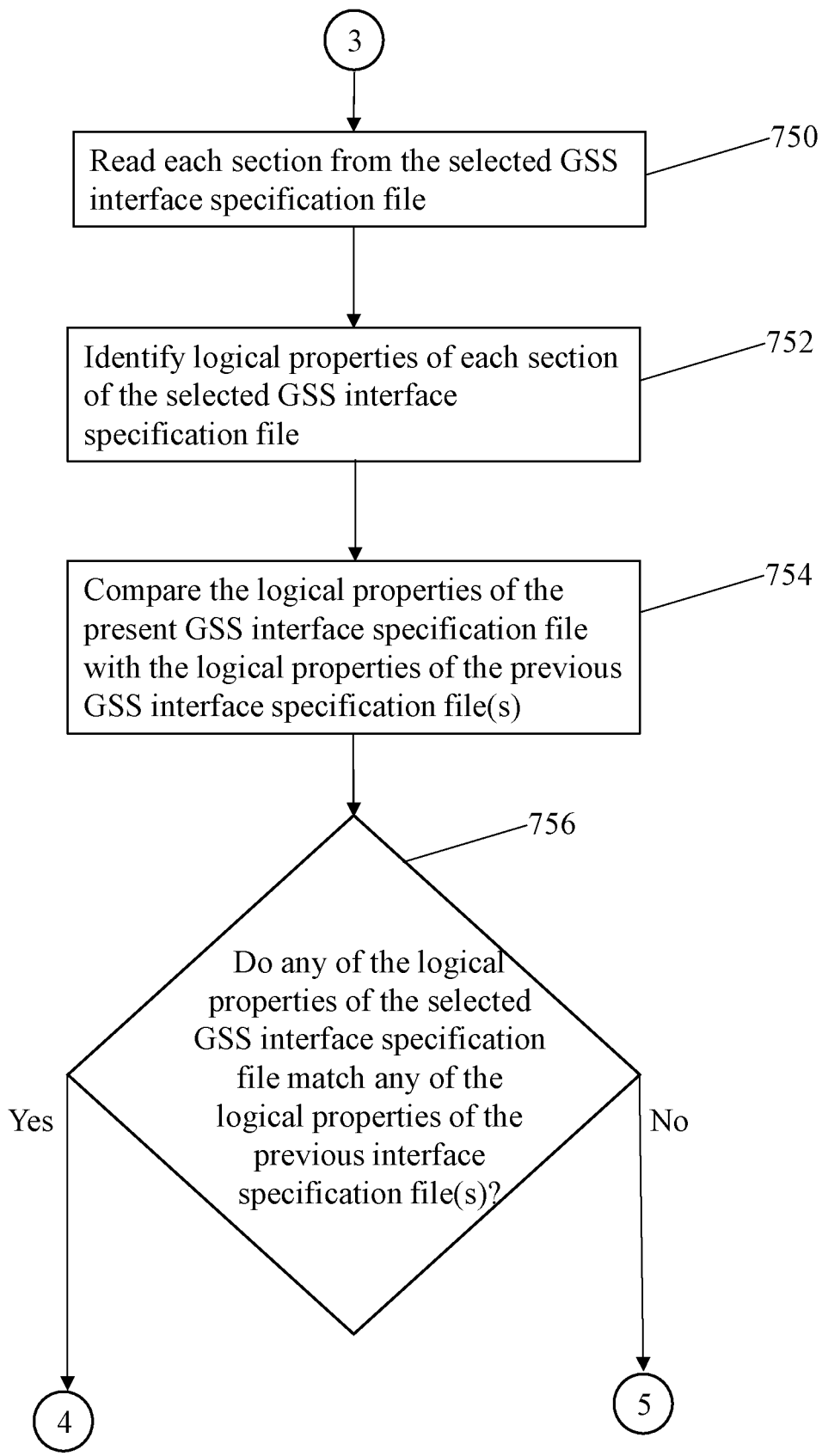
FIG. 7D is a continuation of the flowchart from FIG. 7C, in accordance with some embodiments of the present disclosure.
Figure 7E:
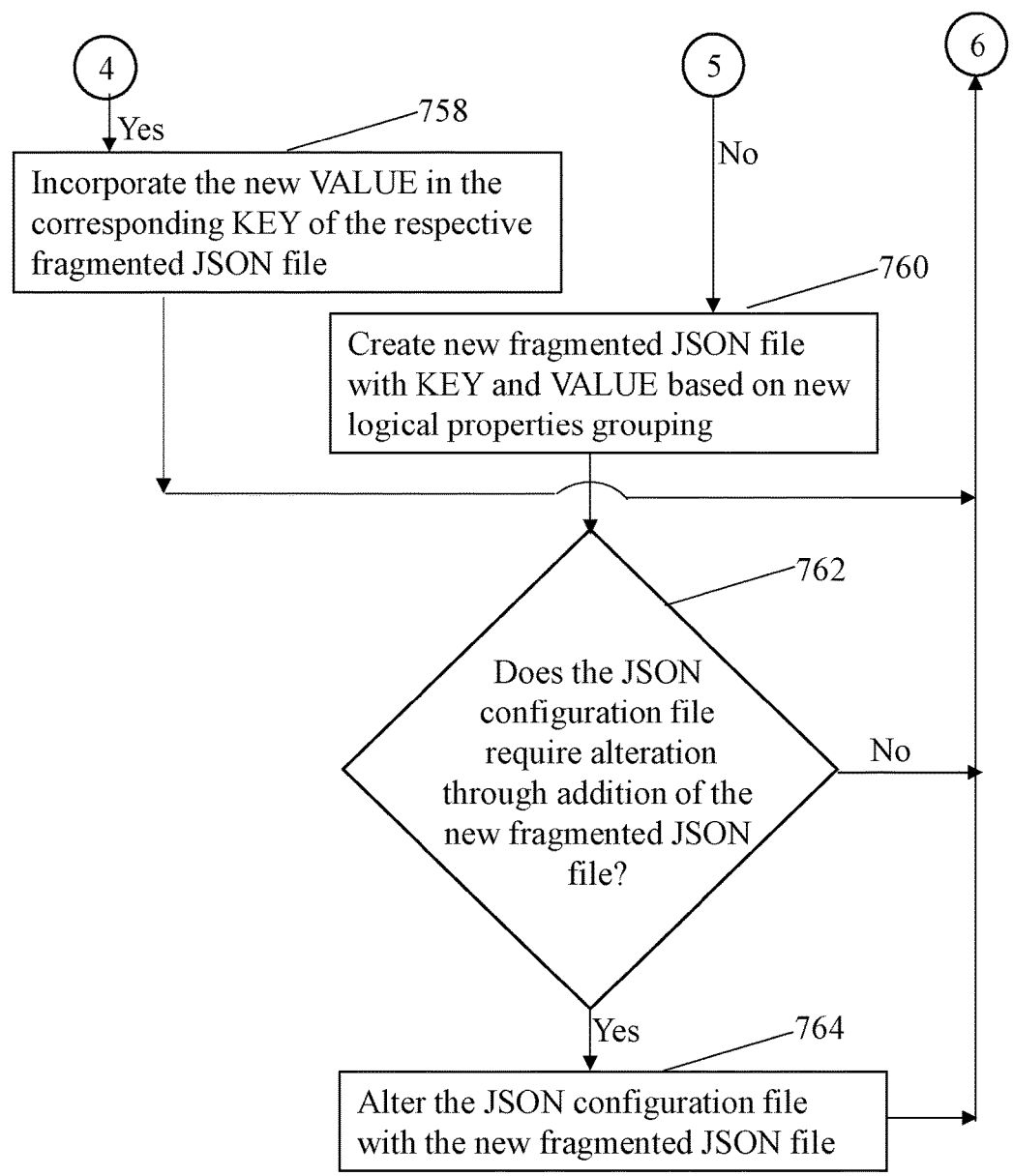
FIG. 7E is a continuation of the flowchart from FIG. 7D, in accordance with some embodiments of the present disclosure.

Referring to FIG. 7D, a continuation of the flowchart illustrating the process 702 from FIG. 7C is provided, and continuing to refer to FIGS. 4, 5, 6, 7A, 7B, and 7C, in at least some embodiments, in a manner similar to that for the read operation 732, each section of the presently selected GSS interface specification file 602, i.e., $IS_{2,1}$, is read 750 from section $A_{2,1}$ through section $Z_{2,1}$ (as shown in FIG. 6). Further, in a manner similar to the identification operation 734, as the sections are read 750, the logical properties in each section are identified 752. More specifically, included in the analyses, each section is executed during runtime through a generic parsing application, thereby rendering the universal interface adaptor engine 542 and the process 700 as described herein substantially agnostic to the native programming languages and communications protocols of the GSS interfaces. In some embodiments, one or more particular vendors may have provided one or more GSS interfaces where there is no commonality of the fragmented JSONs from interface-to-interface. For such embodiments, one or more separate vendor-specific parsers may be used for those vendors. Accordingly, communications protocols and message specifications of each section of the selected GSS interface specification file $IS_{2,1}$ are parsed.

In some embodiments, the logical properties of the presently selected GSS interface specification file, e.g., $IS_{2,1}$ are compared 754 with the logical properties of the previous GSS interface specification file(s), e.g., $IS_{1,1}$. A determination operation 756 is executed to determine if any of the logical properties of the present GSS interface specification file, i.e., $IS_{2,1}$, match any of the logical properties of the previous GSS interface specification file(s) (i.e., $IS_{1,1}$). Since in the present example, the selected first GSS interface to be analyzed is a POS interface, and both GSS interface specification files $IS_{1,1}$ and $IS_{2,1}$ are directed to a POS interface, there is some likelihood that some of the respective logical properties match.

Referring again to FIG. 9, in at least some embodiments, the inquiry associated with the determination operation 756 includes determining if any of the logical properties of the presently selected GSS interface specification file $IS_{2,1}$ are substantially similar to one or more respective keys in one or more of the fragmented JSON files JSON-A 902 through JSON-H 916. In the present example of the comparison between the presently selected GSS interface specification file $IS_{2,1}$ and the previously selected GSS interface specification file $IS_{1,1}$, the fragmented JSON file JSON-A 902 key of interface type is POS for both, therefore, the value of the interface type key ("POS") remains unchanged.

In at least some embodiments, one or more of the values in one or more keys in the fragmented JSON files JSON-A 902 through JSON-H 916 may hold a different value in $IS_{2,1}$ than $IS_{1,1}$. For example, while the key of interface type in fragmented JSON-A 902 may be identical (i.e., "POS"), the values of the key may not be identical. Therefore, referring to FIG. 7E, a continuation of the flowchart illustrating the process 702 from FIG. 7D is provided, and continuing to refer to FIGS. 4, 5, 6, 7A, 7B, 7C, and 7D in at least some embodiments, for a positive ("Yes") response to the inquiry associated with the determination operation 756, the new value in the corresponding key of the respective fragmented JSON file is incorporated 758 with the previous values. Here, in the present example, the value "$PMS_2$" is added to the facility code key in the fragmented JSON-A 902, where "$PMS_2$" is italicized for clarity. Upon completion of the incorporating operation 758, the process 702 returns to the $PMS_X$ incrementing operation 742.

In some embodiments, a negative response ("No") to the inquiry associated with the determination operation 756 results in creation 760 of a new fragmented JSON file (see JSON-J 930) with new logical properties that include, without limitation, a first key with a first value and a second key with a second value based on the new logical properties' grouping. In some embodiments, one reason for failure to match logical properties of a particular GSS interface specification 602 may be that the vendor-supplied GSS interface 550 is sufficiently unique that a match would not be likely. A determination operation 762 includes the inquiry does the JSON configuration file 920 require alteration through the addition of the new fragmented JSON file through execution of the creation operation 760. For a positive ("Yes") response, the JSON configuration file 920 is altered 762 through the addition of the new fragmented file JSON-J 930. A negative ("No") response to the determination operation 762 returns the process 702 to the $PMS_X$ incrementing operation 742. Similarly, upon completion of the altering 752 operation, the process 702 returns to the $PMS_X$ incrementing operation 742.

In one or more embodiments, a positive response ("Yes") to the inquiry at the determination operation 744 (see FIG. 7C), is indicative that all of the PMSs 504 have been exhausted for the analysis on the selected GSS interface, i.e., $GSS\ Interface_1$. The process 702 proceeds to an incrementing operation 770 (see FIG. 7A) where the GSS $Interface_Z$ counting variable Z is incremented 770. Subject to the GSS $Interface_Z$ counting variable Z incrementing operation 770, a determination operation 772 is executed to determine if all of the GSS interfaces 550 represented by GSS $Interface_Z$ have been subject to analysis as described herein. A positive response ("Yes") to the determination operation 772 results in the process 702 proceeding to an end the consolidation process operation 774, followed by a proceed operation 776 to the standardization process operation (see FIG. 8).

A negative response ("No") to the determination operation 772 results in the process 702 returning to the PMS quantity assignment operation 714 for an analysis of a second GSS interface 550, i.e., a GSS $Interface_2$. In the embodiments where the GSS $Interface_2$ is directed toward one or more of the various key card readers, the interface type key in the JSON-A 902 will be populated with the "KEY" value.

Therefore, in one or more embodiments, once substantially all of the GSS interfaces 550 throughout substantially all of the PMSs 504 have been analyzed and the respective fragmented JSON files JSON-A 902 through JSON-J 930 and beyond have been created, the consolidation is completed, where the end products are the respective fragmented JSON files JSON-A 902 through JSON-J 930 and beyond based on the respective vendor interface specifications and consolidated in the JSON configuration library 900.

Figure 8A:
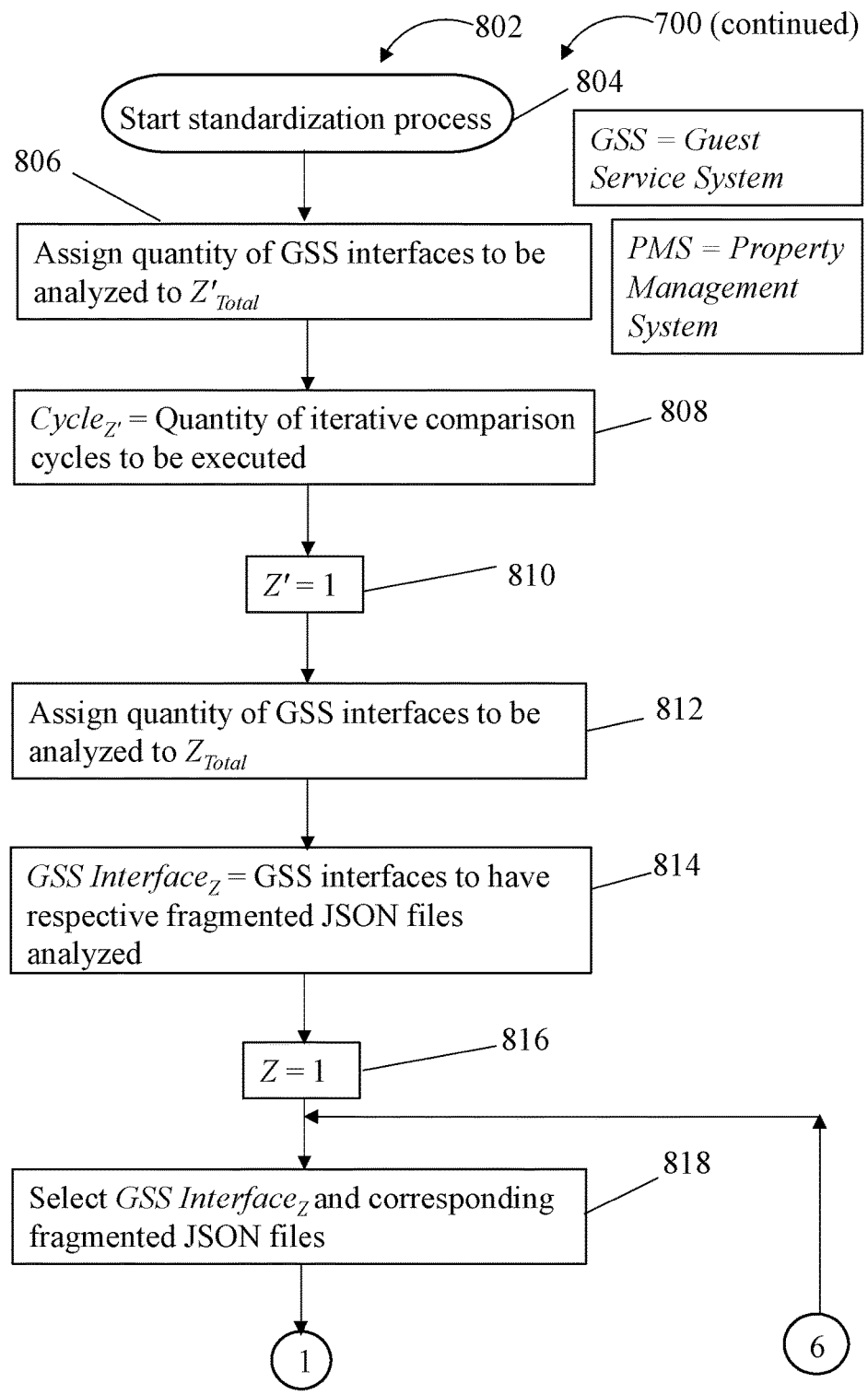
FIG. 8A is a flowchart illustrating a second portion of the process for integrating centralized systems and services with disparate devices and their respective non-standardized communications protocols and message specifications, in accordance with some embodiments of the present disclosure.

Referring to FIG. 8A, a flowchart is provided illustrating a second portion 802 of the process 700 for integrating centralized systems and services with disparate devices and their respective non-standardized communications protocols and message specifications. As previously described, the process 700 includes a first portion 702, hereon referred to as the consolidation process 702, described with respect to FIGS. 7A through 7E. Also, as previously described, the process 700 also includes the second portion 802, i.e., a standardization process 802, as described further with respect to FIGS. 8A through 8C. As described herein, the process 700 is fully automated, including the consolidation process 702 and the standardization process 802.

Also, referring to FIG. 7A, the consolidation process 702 concludes with the consolidation process end operation 774 followed by an automated proceed operation 776 to the standardization process 802. Further referring to FIGS. 4, 5, 6, and 9, the process 802 includes a standardization process start operation 804. As previously described, the universal interface adaptor engine 542 is in operation substantially continuously to automatically execute the process 700, including the process 702 and 802, as the respective GSS interface specifications 602 are updated or new GSS interfaces specifications 602 are added as a function of maintenance in, or replacement of, the infrastructure associated with the GSS interfaces 550.

In one or more embodiments, the standardization process 802 includes assigning 806 the variable $Z'_{Total}$ to represent a quantity of GSS interfaces 550 to be analyzed. The variable $Cycle_{Z'}$ is individually assigned 808 to each of the iterative comparison cycles of the GSS interfaces 550 through execution of the standardization process 802. A corresponding iterative cycle variable, Z', is initialized 810 at 1.

In at least some embodiments, the standardization process 802 also includes assigning 812 the variable $Z_{Total}$ to represent a quantity of GSS interfaces 550 to be analyzed. The variable GSS $Interface_Z$ is individually assigned 814 to each of the GSS interfaces 550 to be analyzed. A corresponding GSS interface 550 variable, Z, is initialized 816 at 1. Therefore, a GSS $Interface_1$, including the corresponding fragmented JSON files from the JSON configuration library 900 (shown as 450 in FIG. 4), are selected 818 for analysis within the standardization process 802. For an example, in those embodiments where the GSS $Interface_1$ is a POS, the inventory of corresponding fragmented JSON files from JSON-A 902 through JSON-J 930 are selected for the pending analysis.

Figure 8B:
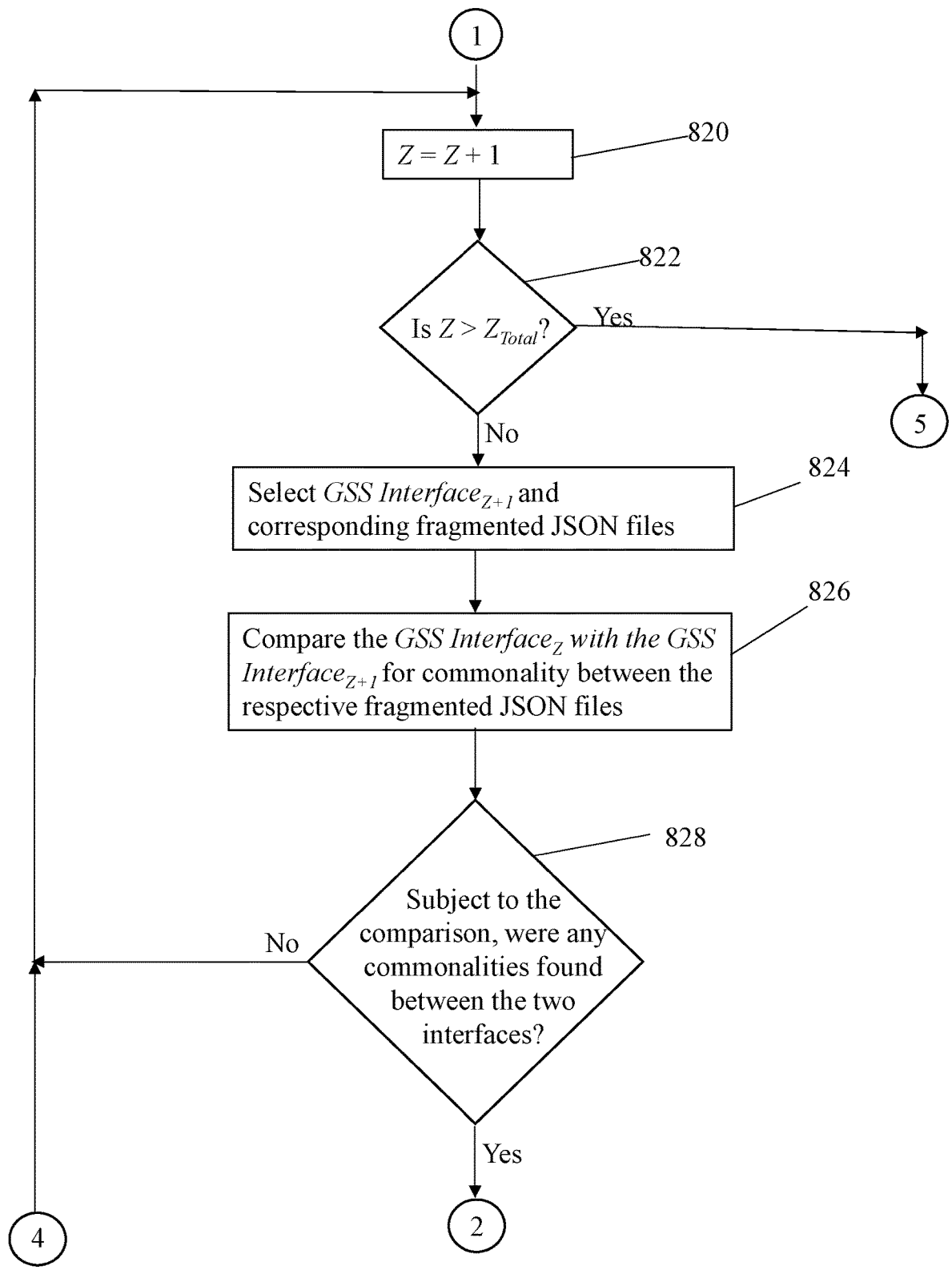
FIG. 8B is a continuation of the flowchart from FIG. 8A, in accordance with some embodiments of the present disclosure.

Referring to FIG. 8B, a continuation of the flowchart illustrating the process 802 from FIG. 8A is provided, and continuing to refer to FIGS. 4, 5, 6, and 8A, in one or more embodiments, the process 802 proceeds to an incrementing operation 820 where the GSS $Interface_Z$ counting variable Z is incremented 820. Subject to the GSS $Interface_Z$ counting variable Z incrementing operation 820, a determination operation 822 is executed to determine if all of the GSS interfaces 550 represented by GSS $Interface_Z$ have been subject to analysis as described herein. A negative response ("No") to the determination operation 822 results in the process 802 proceeding to a GSS $Interface_{Z+1}$, e.g., a GSS $Interface_2$, including the corresponding fragmented JSON files from the JSON configuration library 900, selected 824 for analysis within the standardization process 802. For an example, in those embodiments where the GSS $Interface_2$ is a KEY interface, the inventory of corresponding fragmented JSON files from JSON-A 902 through JSON-J 930 are selected for the pending analysis. Fragmented JSON files corresponding to the GSS Interface$_{Z+1}$ are compared 826 with the fragmented JSON files corresponding to the GSS Interface$_Z$ to determine any commonality therebetween the respective fragmented JSON files for the two GSS interfaces. For example, in those embodiments where a GSS Interface$_2$ is a KEY interface and a GSS Interface$_1$ is a POS interface, any common logical properties, i.e., common keys are searched for. Subject to the comparison operation 826, a determination operation 828 is executed to determine if there were any commonalities found between the two interfaces GSS Interface$_{Z+1}$ and GSS Interface$_Z$. For a negative response ("No") to the determination operation 828, the process 802 returns to the incrementing operation 820 to select a next GSS interface 550 for the comparison operation 826.

Figure 8C:
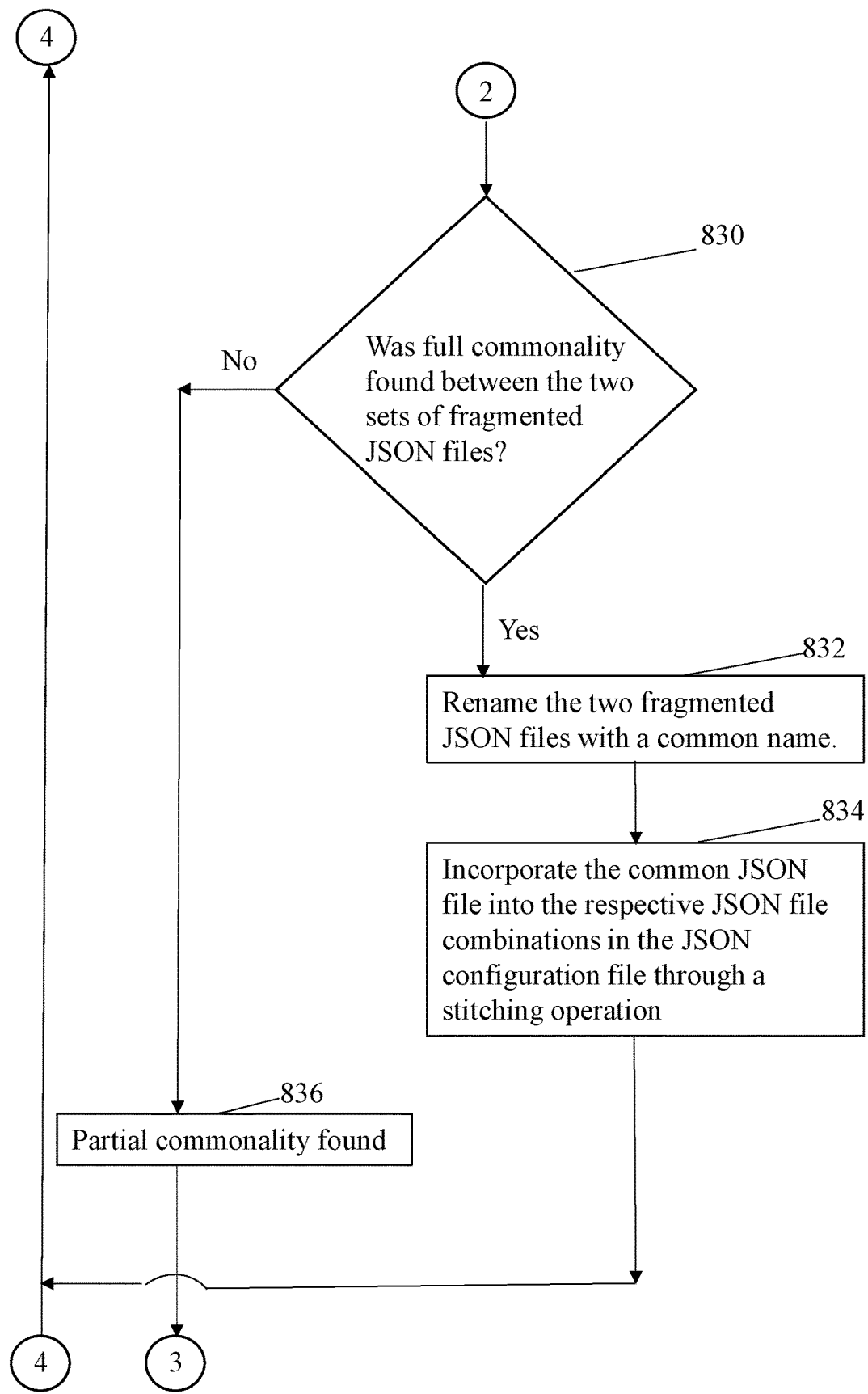
FIG. 8C is a continuation of the flowchart from FIG. 8B, in accordance with some embodiments of the present disclosure.

Referring to FIG. 8C, a continuation of the flowchart illustrating the process 802 from FIG. 8B is provided, and continuing to refer to FIGS. 4, 5, 6, 8A, and 8B, in some embodiments, for a positive response ("Yes") to the determination operation 828, the process 802 proceeds to a determination operation 830 to determine if full commonality is found between the two sets of fragmented JSON files respectively corresponding to the two interfaces GSS Interface$_{Z+1}$ and GSS Interface$_Z$. For a positive response ("Yes") to the determination operation 830, any two substantially similar fragmented JSON files, e.g., a first fragmented JSON file XXX.json corresponding to the GSS Interface$_Z$ and a second fragmented JSON file YYY.json corresponding to the GSS Interface$_{Z+1}$ are both renamed 832 to a common file name. In some embodiments, the common file name will be one of either XXX.json and YYY.json. In some embodiments, a new file name will be used, e.g., ZZZ.json. Also, referring to FIG. 9, the renamed common fragmented JSON file is incorporated 834 into the associated standardized JSON file combinations 922 in the JSON configuration file 920 through a stitching operation executed at runtime by the JSON stitching module 436. Subject to completion of the incorporation operation 834, the process returns to the incrementing operation 820 to facilitate comparing the first GSS interface 550, i.e., GSS Interface$_1$ to a next GSS interface 550, e.g., GSS Interface$_3$. Accordingly, the GSS Interface$_1$ will be compared to all of the GSS interfaces 550 up to, and including, GSS$_{N,K}$. In some embodiments, a negative response ("No") to the determination operation 830 results in a partial commonality being found 836 between the two sets of fragmented JSON files respectively corresponding to the two interfaces GSS Interface$_{Z+1}$ and GSS Interface$_Z$.

Figure 8D:
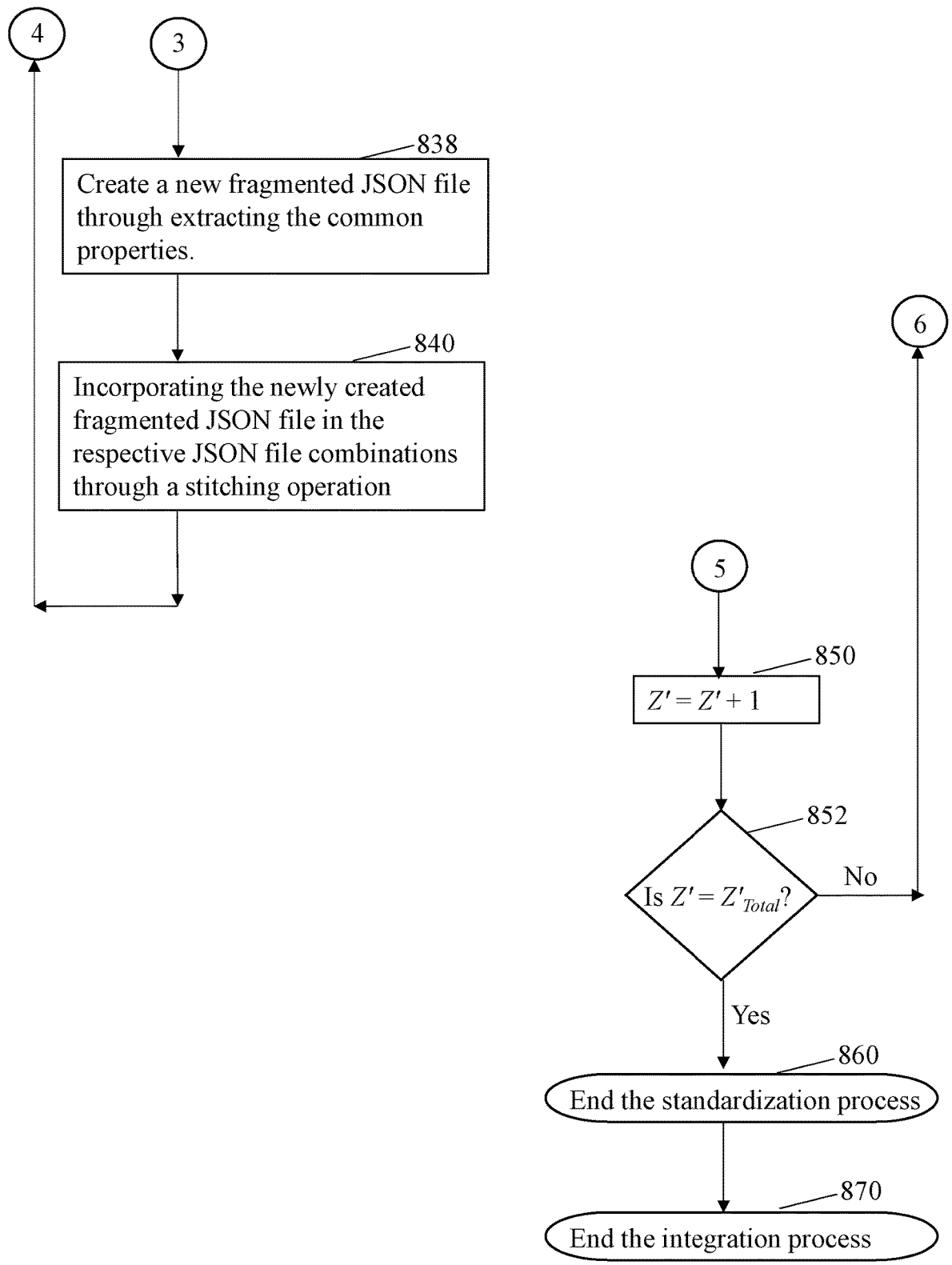
FIG. 8D is a continuation of the flowchart from FIG. 8C, in accordance with some embodiments of the present disclosure.

Referring to FIG. 8D, a continuation of the flowchart illustrating the process 802 from FIG. 8C is provided, and continuing to refer to FIGS. 4, 5, 6, 8A, 8B, and 8C, in some embodiments, subject to finding 836 partial commonality between the two sets of fragmented JSON files respectively corresponding to the two interfaces GSS Interface$_{Z+1}$ and GSS Interface$_Z$, a new fragmented JSON file, e.g., JSON-PQR 940 is created 838 through extracting the common properties from the two sets of fragmented JSON files. The newly created fragmented JSON file JSON-PQR 940 will be incorporated 840 in the respective standardized JSON file combinations 922 in the JSON configuration file 920 through a stitching operation executed at runtime by the JSON stitching module 436. Subject to completion of the incorporation operation 840, the process returns to the incrementing operation 820 to facilitate comparing the respective fragmented JSON files of the first GSS interface 550, i.e., GSS Interface$_1$ to the respective fragmented JSON files of the next GSS interface 550, e.g., GSS Interface$_3$. Accordingly, the respective fragmented JSON files of the GSS Interface$_1$ will be compared to the respective fragmented JSON files of all of the GSS interfaces 550 up to, and including, GSS$_{N,K}$.

Referring again to FIG. 8B, and in particular, the determination operation 822, in some embodiments, a positive response ("Yes") to the determination operation 822 is indicative of the completion of the first round of the iterative comparison cycles. More specifically, the fragmented JSON files corresponding to the GSS Interface$_1$ have been compared to all other fragmented JSON files corresponding to the other GSS interfaces 550. Therefore, a mechanism to increment the standardization process to facilitate comparing the respective fragmented JSON files of the GSS Interface$_2$ to all of the respective fragmented JSON files of the other GSS interfaces 550 with the exception of the GSS Interface$_1$ (the comparison was executed in the first iteration), and then compare the respective fragmented JSON files of the GSS Interface$_3$ to all of the other respective fragmented JSON files of the GSS interfaces 550 with the exception of the GSS Interface$_1$ and the GSS Interface$_2$, etc. is applied. The first three operations for such iterative comparison cycle incrementing includes the operations 806, 808, and 810 (as shown in FIG. 8A). Referring again to FIG. 8D, the iterative comparison cycle incrementing further includes an incrementing operation 850 where the Cycle$_{Z'}$ counting variable Z' is incremented 850. Subject to the Cycle$_{Z'}$ counting variable Z' incrementing operation 850, a determination operation 852 is executed to determine if the respective fragmented JSON files of all of the GSS interfaces 550 represented by GSS Interface$_Z$ have been subject to the comparison analysis as described herein. A negative response ("No") to the determination operation 852 results in the process 802 proceeding to the GSS Interface$_Z$ selection operation 818, where the numerical values for both variable Z (indicative of the GSS interface 550 being analyzed) and Z' (indicative of the present iterative cycle) are identical. Notably, in contrast to the determine operation 822. Where the mathematical operator ">" is used, the determination operation 852 uses the mathematical operator "=" since it is not necessary to compare the last GSS interface 550 to itself.

In embodiments, a positive response ("Yes") to the determination operation 852 is indicative that all of the fragmented JSON files of all the vendor interfaces throughout a suite of related facilities throughout an enterprise have been analyzed. The positive response results in the standardization process 802 ending 860, followed by the integration process 700 ending 870. For the purposes of clarity, this present runtime integration of the GSSs to the PMSs may be completed. However, the adaptor 430 and the associated components remain in service to automatically add new, and update and maintain existing stitched standardized JSON file combinations 922 within the JSON configuration file 920. Upon completion of the integration process 700, a plurality of stitched, standardized JSON file combinations 922 are created. Each standardized JSON file combination 922 includes logically-based, reusable, common fragmented JSONs that may subsequently be used for association, aggregation, and composition for current and newly installed or modified vendor interfaces. The standardized JSON file combinations 922 are configured to communicate with the respective PMSs to execute the proper operation of the respective GSS interfaces 550 through one or more REST APIs via the cloud 530. In the example embodiments, particular fragmented JSON files are used to create the standardized JSON file combinations 922. However, any number of fragmented JSON files of any nature may be used to build the standardized JSON file combinations that enables operation of the adaptor 430 and the integration process 700 as described herein. In addition, for those unique vendor GSS interfaces 550 that do not share any commonality with other interfaces, thereby requiring the use of the separate message parser module 434 to read the respective GSS interface specifications 602, a vendor-specific standardized JSON file combination 922 may be created through one or more fragmented JSON files similar to the JSON-J 930.

The system, computer program product, and method as disclosed herein facilitates overcoming the disadvantages and limitations of known systems and methods for integrating centralized systems and services with disparate devices and their respective non-standardized communications protocols and message specifications. The generation and use of standardized JSON file combinations facilitates establishing cloud-based communications between centralized systems and interface systems, thereby significantly reducing, and in some cases, eliminating reliance on communications hardware such as wires and cables, thereby facilitating a cost-effective solution to cloud migration of existing communications between the centralized systems and interface systems. In addition, the existing local interface application servers may be reused as the gateways for the on-cloud communications, thereby enhancing the cost-effectiveness of the systems and methods described herein. The systems and methods described herein substantially eliminate reliance on serial and IP communications through creating the reusable fragmented JSON files and the resulting standardized JSON file combinations that use REST APIs establish transmissible communications through the cloud between the centralized systems and interface systems.

Moreover, the migration to a cloud-based communications as described herein uses generic parsers and separate parsers (for unique vendor-supplied interface specifications) to read the interface specifications of the existing legacy interface systems into a centralized specification library. The parsers facilitate the systems and methods described herein as being substantially agnostic to the native languages of the vendor-supplied interfaces, thereby facilitating automatic integration of a plurality of heterogenous systems. Also, the systems and methods described herein are robust and fully automatic. Therefore, any new interface systems introduced in any facility may be automatically integrated into the cloud-based communications infrastructure with minimal or no changes to the centralized specification library. Further, the creating of reusable fragmented JSON files facilitates reducing the interface specifications to a smaller library through the componentization of the large number of vendor-supplied interface systems. In addition, since the fragmented JSON files are generated from the vendor-supplied interface specifications that are cross-compared such that the resultant fragmented JSON files and resultant JSON file combinations are standardized to facilitate operation of all similar interfaces, thereby facilitating a universal communications framework. Furthermore, the fragmented JSON files created and used as described herein are created logically based on certain criteria, such as, and without limitation, interface type, protocol, startbit, stopbit, generic message structure, and specific message structure for the different types of messages, etc., so that all possible interface systems may be addressed for any interface parsing.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
one or more processing devices and at least one memory device operably coupled to the one or more processing devices, the one or more processing devices are configured to:
identify one or more interface systems for one or more facilities, wherein each facility of the one or more facilities includes a centralized computing system;
capture one or more interface specifications for the respective one or more interface systems;
create two or more JavaScript Object Notation (JSON) files from the one or more interface specifications, wherein each JSON file of the two or more JSON files includes one or more logical properties associated with the respective one or more interface systems;
create one or more JSON file combinations through stitching at least a portion of the two or more JSON files; and
establish cloud-based communications between the one or more interface systems and the respective centralized system of the one or more facilities through the one or more JSON file combinations.

2. The system of claim 1, wherein the one or more processing devices are further configured to:
store the two or more JSON files and the JSON file combinations, wherein the two or more JSON files and the one or more JSON file combinations are standardized and reusable.

3. The system of claim 1, wherein the one or more processing devices are further configured to:
analyze, serially, each interface specification of the one or more interface specifications, wherein at least a portion of the one or more interface specifications comprises non-standardized communication and transaction features; and
identify the one or more logical properties in each interface specification of the one or more interface specifications.

4. The system of claim 3, wherein the one or more processing devices are further configured to:
use a generic parser to analyze a first portion of the one or more interface specifications; and
use a separate parser to analyze a second portion of the one or more interface specifications.

5. The system of claim 3, wherein the one or more processing devices are further configured to:
identify, from the one or more interface specifications, one or more similar interface specifications.

6. The system of claim 3, wherein the one or more processing devices are further configured to:
compare the one or more logical properties of a second interface specification with the one or more logical properties of a first interface specification; and
identify one or more common logical properties between the first interface specification and the second interface specification.

7. The system of claim 6, wherein the one or more processing devices are further configured to:
create two or more fragmented JSON files, wherein each fragmented JSON file of the two or more fragmented JSON files corresponds to at least one of the one or more logical properties.

8. The system of claim 7, wherein the one or more processing devices are further configured to:
incorporate one or more portions of the second interface specification into a first fragmented JSON file of the two or more fragmented JSON files at least partially based on the identified one or more common logical properties; and
create a second fragmented JSON file of the two or more fragmented JSON files at least partially based on identifying no common logical properties.

9. The system of claim 7, wherein the one or more processing devices are further configured to:
determine one of no commonality, partial commonality, and full commonality between the two or more fragmented JSON files;
rename the two or more fragmented JSON files with a common name for those determinations of full commonality; and
create a new fragmented JSON file through extracting one or more common properties from the two or more fragmented JSON files for those determinations of partial commonality.

10. A computer program product, the computer program product comprising:
one or more computer readable storage media; and
program instructions collectively stored on the one or more computer-readable storage media, the program instructions comprising:
program instructions to identify one or more interface systems for one or more facilities, wherein each facility of the one or more facilities includes a centralized computing system;
program instructions to capture one or more interface specifications for the respective one or more interface systems;
program instructions to create two or more JavaScript Object Notation (JSON) files from the one or more interface specifications, wherein each JSON file of the two or more JSON files includes one or more logical properties associated with the respective one or more interface systems;
program instructions to create one or more JSON file combinations through stitching at least a portion of the two or more JSON files; and
program instructions to establish cloud-based communications between the one or more interface systems and the respective centralized system of the one or more facilities through the one or more JSON file combinations.

11. The computer program product of claim 10, further comprising:
program instructions to analyze, serially, each interface specification of the one or more interface specifications, wherein at least a portion of the one or more interface specifications comprises non-standardized communication and transaction features;
program instructions to identify the one or more logical properties in each interface specification of the one or more interface specifications;
program instructions to use a generic parser to analyze a first portion of the one or more interface specifications;
program instructions to use a separate parser to analyze a second portion of the one or more interface specifications;
program instructions to compare the one or more logical properties of a second interface specification with the one or more logical properties of a first interface specification;
program instructions to identify one or more common logical properties between the first interface specification and the second interface specification;
program instructions to create two or more fragmented JSON files, wherein each fragmented JSON file of the two or more fragmented JSON files corresponds to at least one of the one or more logical properties;
program instructions to incorporate one or more portions of the second interface specification into a first fragmented JSON file of the two or more fragmented JSON files at least partially based on the identified one or more common logical properties; and
program instructions to create a second fragmented JSON file of the two or more fragmented JSON files at least partially based on identifying no common logical properties;
program instructions to determine one of no commonality, partial commonality, and full commonality between the two or more fragmented JSON files;
program instructions to rename the two or more fragmented JSON files with a common name for those determinations of full commonality; and
program instructions to create a new fragmented JSON file through extracting one or more common properties from the two or more fragmented JSON files for those determinations of partial commonality.

12. A computer-implemented method comprising:
identifying one or more interface systems for one or more facilities, wherein each facility of the one or more facilities includes a centralized computing system;
capturing one or more interface specifications for the respective one or more interface systems;
creating two or more JavaScript Object Notation (JSON) files from the one or more interface specifications, wherein each JSON file of the two or more JSON files includes one or more logical properties associated with the respective one or more interface systems;
creating one or more JSON file combinations through stitching at least a portion of the two or more JSON files; and
establishing cloud-based communications between the one or more interface systems and the respective centralized system of the one or more facilities through the one or more JSON file combinations.

13. The method of claim 12, further comprising:
storing the two or more JSON files and the JSON file combinations, wherein the two or more JSON files and the one or more JSON file combinations are standardized and reusable.

14. The method of claim 12, further comprising:
analyzing, serially, each interface specification of the one or more interface specifications, wherein at least a portion of the one or more interface specifications comprises non-standardized communication and transaction features; and
identifying the one or more logical properties in each interface specification of the one or more interface specifications.

15. The method of claim 14, wherein the analyzing each interface specification comprises one or more of:

using a generic parser to analyze a first portion of the one or more interface specifications; and using a separate parser to analyze a second portion of the one or more interface specifications.

16. The method of claim 14, wherein the analyzing each interface specification comprises:

identifying, from the one or more interface specifications, one or more similar interface specifications.

17. The method of claim 14, wherein the analyzing each interface specification comprises:

comparing the one or more logical properties of a second interface specification with the one or more logical properties of a first interface specification; and identifying one or more common logical properties between the first interface specification and the second interface specification.

18. The method of claim 17, wherein the creating two or more JSON files comprises:

creating two or more fragmented JSON files, wherein each fragmented JSON file of the two or more fragmented JSON files corresponds to at least one of the one or more logical properties.

19. The method of claim 18, wherein the creating two or more fragmented JSON files further comprises:

incorporating one or more portions of the second interface specification into a first fragmented JSON file of the two or more fragmented JSON files at least partially based on the identified one or more common logical properties; and creating a second fragmented JSON file of the two or more fragmented JSON files at least partially based on identifying no common logical properties.

20. The method of claim 18, wherein the creating the one or more JSON file combinations further comprises:

determining one of no commonality, partial commonality, and full commonality between the two or more fragmented JSON files;

renaming the two or more fragmented JSON files with a common name for those determinations of full commonality; and creating a new fragmented JSON file through extracting one or more common properties from the two or more fragmented JSON files for those determinations of partial commonality.

* * * * *